(12) United States Patent
Ono et al.

(10) Patent No.: US 11,386,464 B2
(45) Date of Patent: Jul. 12, 2022

(54) CONTROL METHOD

(71) Applicant: CANON KABUSHIKI KAISHA, Tokyo (JP)

(72) Inventors: Kaede Ono, Kawasaki (JP); Daiki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 16/884,659

(22) Filed: May 27, 2020

(65) Prior Publication Data

US 2020/0380566 A1 Dec. 3, 2020

(30) Foreign Application Priority Data

May 31, 2019 (JP) .............................. JP2019-102861

(51) Int. Cl.
*G06Q 30/02* (2012.01)
*H04W 4/80* (2018.01)
*G06F 3/12* (2006.01)

(52) U.S. Cl.
CPC ....... *G06Q 30/0269* (2013.01); *G06F 3/1209* (2013.01); *G06F 3/1269* (2013.01); *G06Q 30/0261* (2013.01); *H04W 4/80* (2018.02)

(58) Field of Classification Search
CPC ............ G06Q 30/0269; G06Q 30/0261; G06F 3/1209; G06F 3/1269; G06F 3/1221; G06F 3/1204; G06F 3/1226; H04W 4/80

USPC ........................................................ 455/41.2
See application file for complete search history.

(56) References Cited

U.S. PATENT DOCUMENTS

| 9,064,390 | B1 * | 6/2015 | Clark | ........................ G08B 5/36 |
| 11,132,275 | B2 * | 9/2021 | Mathews | ................ H04L 67/04 |
| 2020/0137542 | A1 * | 4/2020 | Jung | ...................... H04W 76/14 |

FOREIGN PATENT DOCUMENTS

JP 2017-188869 A 10/2017

* cited by examiner

*Primary Examiner* — Eugene Yun
(74) *Attorney, Agent, or Firm* — Canon U.S.A., Inc. I.P. Division

(57) ABSTRACT

To more appropriately acquire information in Generic Attribute Profile (GATT) data, a control method includes acquiring, upon establishment of a second connection between a communication apparatus and an information processing apparatus through Bluetooth® Low Energy, at least a part of information indicating a structure of GATT data included in the communication apparatus until an area in which a predetermined type of information is stored in the GATT data included in the communication apparatus becomes identifiable, and acquiring the predetermined type of information based on at least a part of the information indicating the structure of the GATT data included in the communication apparatus.

20 Claims, 13 Drawing Sheets

FIG.10

SERVICE
00000000-0000-1000-1000-00405f9b34fb

CHARACTERISTIC
00000000-0000-2000-1000-00405f9b34fb

DESCRIPTOR
00000000-0000-2000-1000-00405f9b3400

FIG.11

| Service UUID | Service Name | Characteristic UUID | Characteristic Name | Service Readable | Service Writable | Characteristic Readable | Characteristic Writable | Characteristic Indicatable | Value | Pairing Required |
|---|---|---|---|---|---|---|---|---|---|---|
| 0x1801 | GATT Service | 0x2A05 | Service Changed | | | | | ○ | 0 | |
| | | 0x2B2A | Database Hash | ○ | | ○ | | | F0 CA 2D 48 EC F5 8B AC 8A AA 30 BB B9 FB A9 90 | |
| 0x180A | Device Information | 0x2A29 | Manufacturer Name String | ○ | | ○ | | | Printer Device | |
| | | 0x2A24 | Hardware Revision String | | | ○ | | | 1010_AAA | |
| | | 0x2A25 | Firmware Revision String | | | ○ | | | 2030000 | |
| | | 0x2A26 | Software Revision String | | | ○ | | | 1 | |
| 00000000-0000-1000-1000-0040519b34fb | IJ Original | 00000000-0000-1000-1000-0040519b34fb | SSID | ○ | | ○ | | | Printer SSID | ○ |
| | | 00000000-0000-1000-1000-0040519b34fc | Password | | | ○ | | | aaaabbbb | ○ |

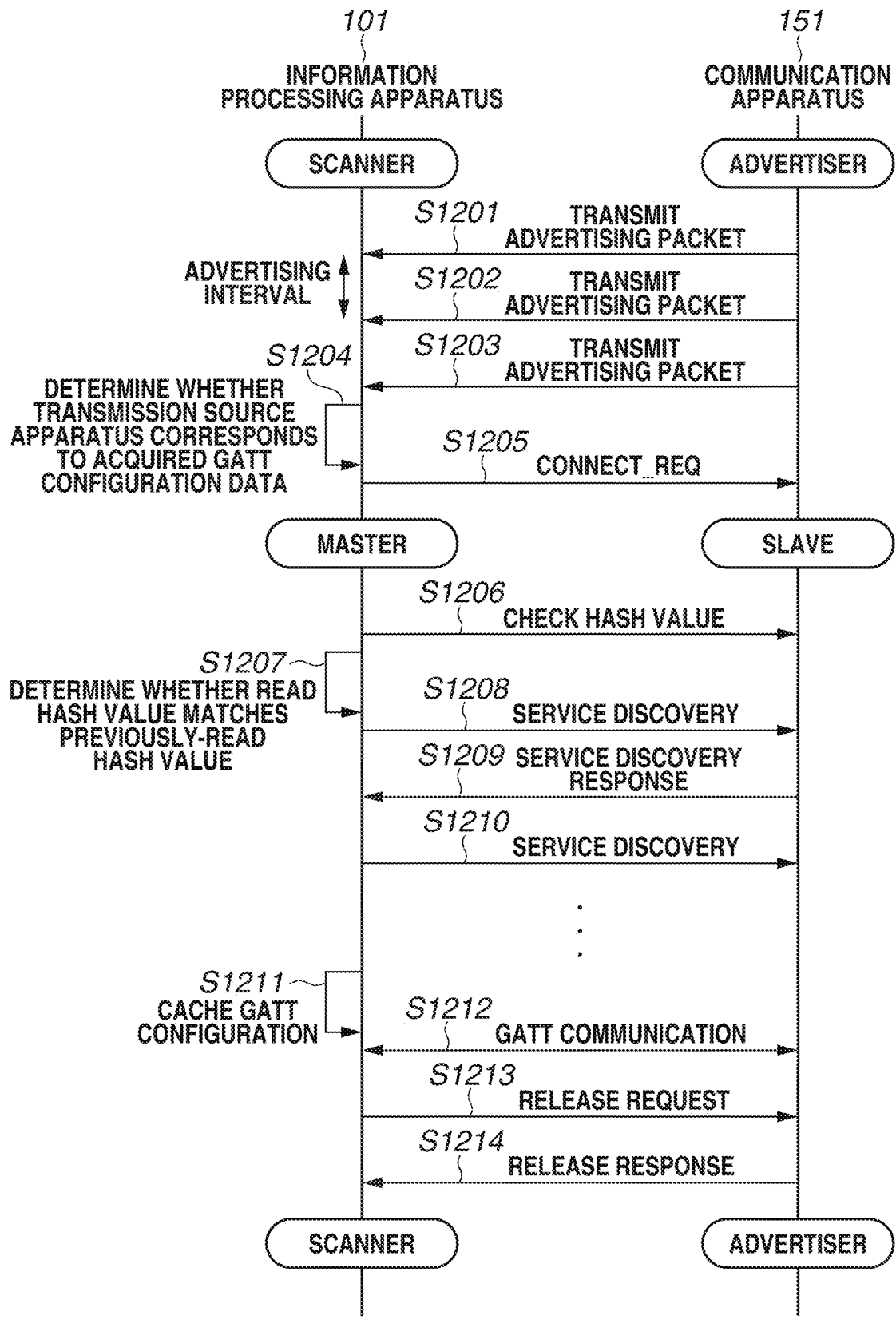

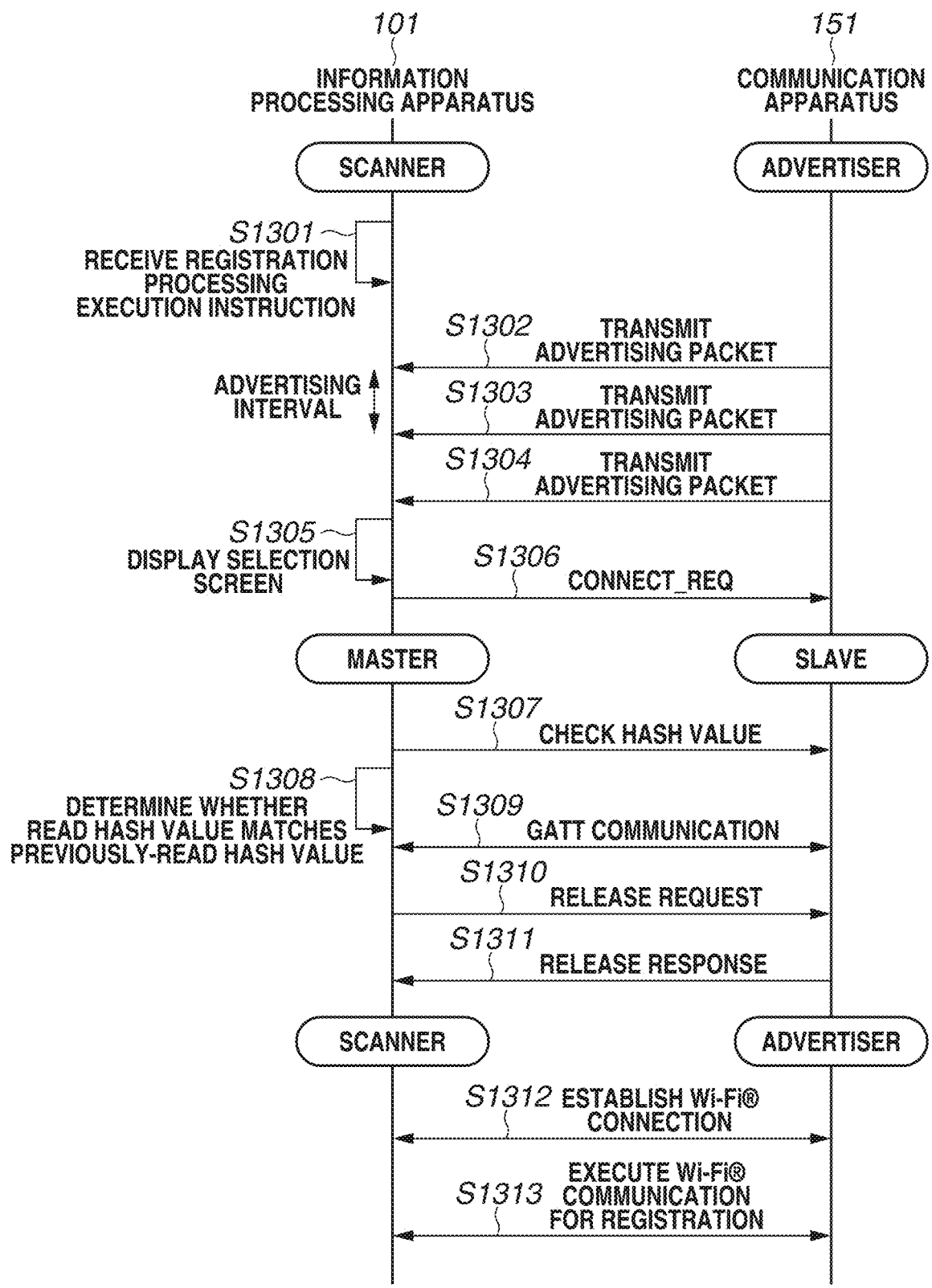

CONTROL METHOD

BACKGROUND

Field of the Disclosure

The present disclosure relates to a control method for controlling the communication between devices. And more specifically relates to a technique capable of more appropriately acquiring information in GATT data.

Description of the Related Art

An apparatus that performs communication by Bluetooth® Low Energy is known. Japanese Patent Application Laid-Open No. 2017-188869 discusses a technique for establishing communication between an information processing apparatus, such as a smartphone, and a communication apparatus, such as a printer, by Bluetooth® Low Energy.

Bluetooth® Low Energy uses a communication method called Generic Attribute Profile (GATT) communication to execute data communication by performing data read/write processing on GATT data included in a communication apparatus. Further, an information processing apparatus can acquire specific information (e.g., hash value) in the GATT data and thus can execute processing using the specific information.

With the widespread use of apparatuses that acquire information in GATT data, there is an increasing demand for more appropriately acquiring information in GATT data.

SUMMARY

According to an aspect of the present disclosure, a control method for an information processing apparatus that communicates with a communication apparatus through Bluetooth® Low Energy, includes acquiring, as a first acquisition, information indicating a structure of Generic Attribute Profile (GATT) data included in the communication apparatus upon establishment of a first connection between the communication apparatus and the information processing apparatus through Bluetooth® Low Energy, acquiring, as a second acquisition, a predetermined type of information in the GATT data included in the communication apparatus, acquiring, as a third acquisition, at least a part of the information indicating the structure of the GATT data included in the communication apparatus upon establishment of a second connection between the communication apparatus and the information processing apparatus through Bluetooth® Low Energy until an area in which the predetermined type of information is stored in the GATT data included in the communication apparatus becomes identifiable, acquiring, as a fourth acquisition, the predetermined type of information based on at least a part of the information indicating the structure of the GATT data included in the communication apparatus, and acquiring newly, as a fifth acquisition, no information that is not acquired in the third acquisition from the information indicating the structure of the GATT data included in the communication apparatus in a case where the predetermined type of information acquired in the second acquisition matches the predetermined type of information acquired in the fourth acquisition, and acquiring newly, as the fifth acquisition, information that is not acquired in the third acquisition from the information indicating the structure of the GATT data included in the communication apparatus in a case where the predetermined type of information acquired in the second acquisition is different from the predetermined type of information acquired in the fourth acquisition.

Further features of the present disclosure will become apparent from the following description of exemplary embodiments with reference to the attached drawings.

BRIEF DESCRIPTION OF THE DRAWINGS

FIG. 10 is a diagram illustrating a GATT data format.

FIG. 11 is a table illustrating an example of GATT data stored in a short-range wireless communication unit.

FIG. 12 is a sequence diagram illustrating processing for caching GATT configuration data.

FIG. 13 is a sequence diagram illustrating a registration function.

DESCRIPTION OF THE EMBODIMENTS

Exemplary embodiments of the present disclosure will be described below by way of example with reference to the accompanying drawings. It should be understood that modifications and alterations that are appropriately made to the exemplary embodiments described below on the basis of general knowledge of a person skilled in the art without departing from the spirit of the present disclosure are included in the scope of the present disclosure.

An information processing apparatus and a communication apparatus included in a communication system according to a first exemplary embodiment will be described. In the present exemplary embodiment, a smartphone is used as an example of the information processing apparatus. However, the information processing apparatus according to the present exemplary embodiment is not limited to this example. Various apparatuses such as a mobile terminal, a notebook personal computer (PC), a tablet terminal, a personal digital assistant (PDA), and a digital camera, can be used as the information processing apparatus according to the present exemplary embodiment. In the present exemplary embodiment, a printer is used as an example of the communication apparatus. However, the communication apparatus according to the present exemplary embodiment is not limited to this example. Various apparatuses can be used as long as the apparatuses can wirelessly communicate with the information processing apparatus. For example, various printers such as an inkjet printer, a full-color laser beam printer, and a monochrome printer can be used as the communication apparatus according to the present exemplary embodiment.

Not only printers, but also a copying machine, a facsimile apparatus, a mobile terminal, a smartphone, a notebook PC, a tablet terminal, a PDA, a digital camera, a music reproduction device, a television, and the like can be used as the communication apparatus according to the present exemplary embodiment. In addition, a multifunction peripheral including a plurality of functions such as a copying function, a facsimile (FAX) function, and a printing function can be used as the communication apparatus according to the present exemplary embodiment.

Figure 1:
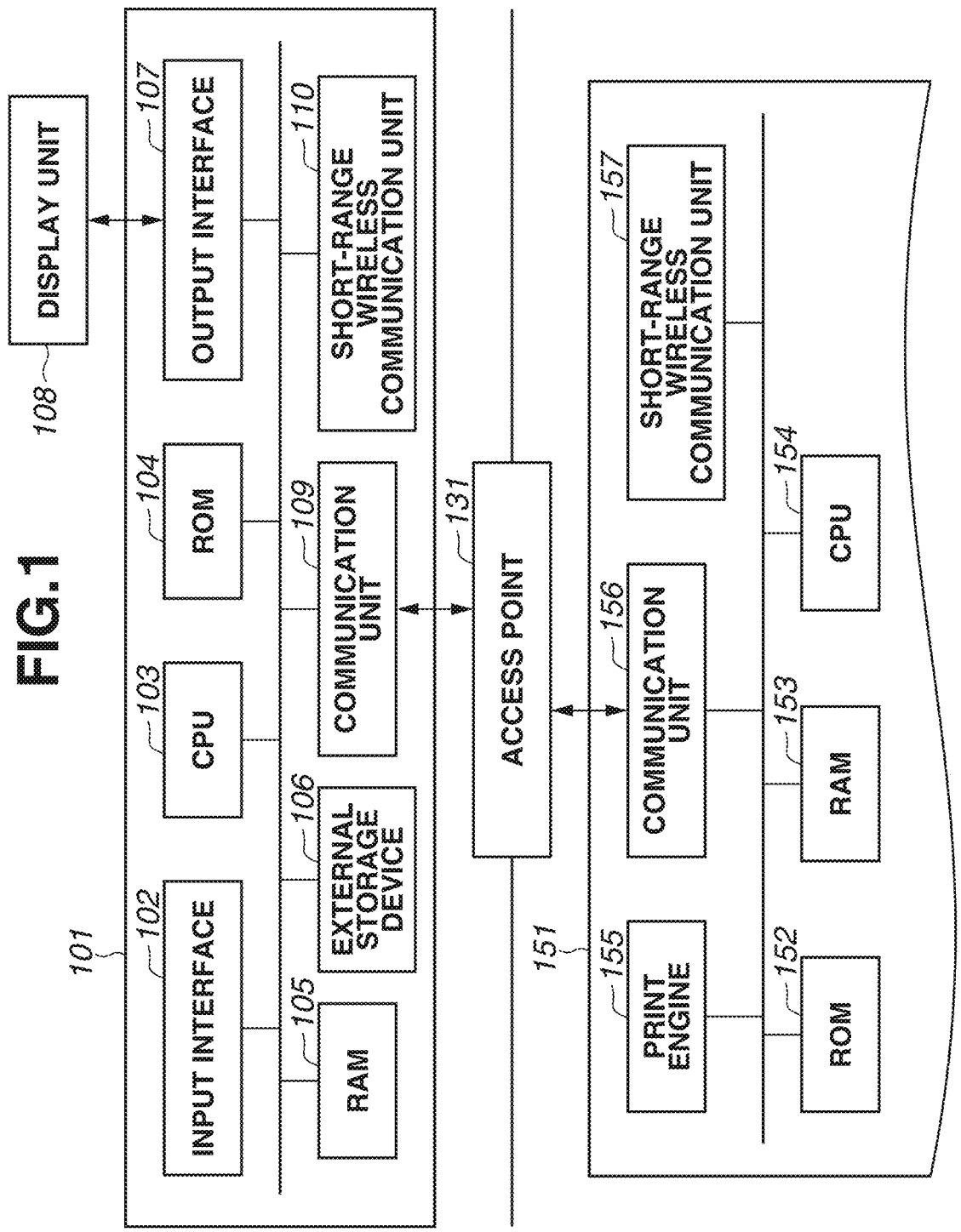
FIG. 1 is a block diagram illustrating an example of a configuration of each of an information processing apparatus and a communication apparatus according to an exemplary embodiment.

First, the configuration of the information processing apparatus according to the present exemplary embodiment and the configuration of the communication apparatus capable of communicating with the information processing apparatus according to the present exemplary embodiment will be described with reference to a block diagram illustrated in FIG. 1. While the present exemplary embodiment illustrates the following configuration, the present exemplary embodiment is applicable to any apparatus capable of communicating with the communication apparatus, and the functions illustrated in FIG. 1 are not particularly limited thereto.

An information processing apparatus 101 is an example of the information processing apparatus according to the present exemplary embodiment. The information processing apparatus 101 includes an input interface 102, a central processing unit (CPU) 103, a read-only memory (ROM) 104, a random access memory (RAM) 105, an external storage device 106, an output interface 107, a display unit 108, a communication unit 109, and a short-range wireless communication unit 110.

The input interface 102 is an interface for receiving a data input and an operation instruction from a user, and is composed of a physical keyboard or button, a touch panel, or the like. The output interface 107 to be described below and the input interface 102 may have the same configuration. Output on a screen and reception of an operation from the user may be performed with the same configuration.

The CPU 103 is a system control unit and controls the overall operation of the information processing apparatus 101.

The ROM 104 stores fixed data such as control programs to be executed by the CPU 103, a data table, and an embedded operating system (hereinafter referred to as an OS) program. In the present exemplary embodiment, each control program stored in the ROM 104 performs software execution control processing, such as scheduling, task switching, and interruption processing, under the control of the embedded OS stored in the ROM 104.

The RAM 105 is composed of a static random access memory (SRAM) or the like that needs a backup power supply. The RAM 105 can store important data, such as program control variables, in a nonvolatile manner, because data is held by a primary battery for data backup (not illustrated). The RAM 105 is also provided with memory areas for storing setting information for the information processing apparatus 101, management data for the information processing apparatus 101, and the like. The RAM 105 is also used as a main memory and a work memory for the CPU 103.

The external storage device 106 stores an application for providing a print execution function, a print information generation program for generating print information that can be interpreted by a communication apparatus 151, and other programs. The external storage device 106 stores various programs, such as information transmission/reception control programs for transmitting and receiving information to and from the communication apparatus 151 connected via the communication unit 109, and various information used by these programs.

The output interface 107 is an interface used for the display unit 108 to display data and notify the state of the information processing apparatus 101.

The display unit 108 is composed of a light-emitting diode (LED), a liquid crystal display (LCD), or the like. The display unit 108 displays data and notifies the state of the information processing apparatus 101. A software keyboard including keys, such as a numerical input key, a mode setting key, an enter key, a cancel key, and a power supply key, may be provided on the display unit 108 to receive an input from the user via the display unit 108.

The communication unit 109 is connected to an apparatus, such as the communication apparatus 151, and is configured to execute data communication. For example, the communication unit 109 is connectable to an access point (not illustrated) in the communication apparatus 151. The communication unit 109 and the access point in the communication apparatus 151 are connected to thereby enable the information processing apparatus 101 and the communication apparatus 151 to communicate with each other. The communication unit 109 may directly communicate with the communication apparatus 151 through wireless communication, or may communicate with the communication apparatus 151 via an external access point (access point 131) located outside the information processing apparatus 101 and outside the communication apparatus 151. Examples of the wireless communication method include Wireless Fidelity (Wi-Fi®) and Bluetooth®. Examples of the access point 131 include a device such as a wireless local area network (LAN) router. In the present exemplary embodiment, a method in which the information processing apparatus 101 and the communication apparatus 151 are directly connected without passing through the external access point is referred to as a direct connection method. In addition, a method in which the information processing apparatus 101 and the communication apparatus 151 are connected via the external access point is referred to as an infrastructure connection method.

The short-range wireless communication unit 110 is wirelessly connected to an apparatus, such as the communication apparatus 151, at a short distance, and is configured to execute data communication. The short-range wireless communication unit 110 performs communication by a communication method different from the communication method used by the communication unit 109. The short-range wireless communication unit 110 is connectable to a short-range wireless communication unit 157 in the communication apparatus 151. In the present exemplary embodiment, Bluetooth® 5.1 is used as the communication method for the short-range wireless communication unit 110. While Bluetooth® 5.1 includes both standards of Classic Bluetooth® and Bluetooth® Low Energy, in the present exemplary embodiment, Bluetooth® Low Energy is used as the communication method for the short-range wireless communication unit 157.

The communication apparatus 151 is an example of the communication apparatus according to the present exemplary embodiment. The communication apparatus 151 includes a ROM 152, a RAM 153, a CPU 154, a print engine 155, a communication unit 156, and the short-range wireless communication unit 157.

The communication unit 156 includes an access point for establishing a connection with an apparatus, such as the information processing apparatus 101, as an access point in the communication apparatus 151. The access point is connectable to the communication unit 109 in the information processing apparatus 101. The communication unit 156 may directly communicate with the information processing apparatus 101 through wireless communication, or may communicate with the information processing apparatus 101 via the access point 131. Examples of the communication method include Wi-Fi® and Bluetooth®. The communication unit 156 may include hardware functioning as an access point, or may operate as an access point by using software for causing the communication unit 156 to function as an access point.

The short-range wireless communication unit 157 is configured to wirelessly connect to an apparatus, such as the information processing apparatus 101, at a short distance. In the present exemplary embodiment, Bluetooth® 5.1 is used as the communication method for the short-range wireless communication unit 157. More specifically, in the present exemplary embodiment, Bluetooth® Low Energy is used as the communication method for the short-range wireless communication unit 157.

The RAM 153 is composed of an SRAM or the like that requires a backup power supply. The RAM 153 can store important data, such as program control variables, in a nonvolatile manner, because data is held by a primary battery for data backup (not illustrated). The RAM 153 is also provided with memory areas for storing setting information for the communication apparatus 151, management data for the communication apparatus 151, and the like. The RAM 153 is also used as a main memory and a work memory for the CPU 154, and works as a reception buffer for temporarily storing print information received from the information processing apparatus 101 or the like, and stores various information.

The ROM 152 stores fixed data such as control programs to be executed by the CPU 154, a data table, and an embedded OS program. In the present exemplary embodiment, each control program stored in the ROM 152 performs software execution control processing, such as scheduling, task switching, and interruption processing, under the control of the embedded OS stored in the ROM 152.

The CPU 154 is a system control unit and controls the overall operation of the communication apparatus 151.

The print engine 155 forms an image on a recording medium, such as paper, using a recording material, such as ink, based on information stored in the RAM 153, a print job received from the information processing apparatus 101, or the like, and outputs a printing result. In this case, the print job transmitted from the information processing apparatus 101 or the like has a large amount of transmission data, and thus high-speed communication is required. Accordingly, the print job is received via the communication unit 156 that is capable of performing communication at a higher speed than the short-range wireless communication unit 157.

The communication apparatus 151 may be provided with a memory, such as an external hard disk drive (HDD) or a secure digital (SD) card, as an optional device, and the information stored in the communication apparatus 151 may be stored therein.

A connection mode is set in the communication apparatus 151 according to the present exemplary embodiment through connection setting processing, and the communication apparatus 151 communicates with the information processing apparatus 101 by using a connection configuration based on the set connection mode. In a case of performing communication through infrastructure connection, an infrastructure connection mode is set as the connection mode in the communication apparatus 151 according to the present exemplary embodiment. In a case of performing communication through direct connection, a direct connection mode is set as the connection mode in the communication apparatus 151 according to the present exemplary embodiment.

In the present exemplary embodiment, an example where the information processing apparatus 101 and the communication apparatus 151 share the processing is described. However, the processing to be performed by the information processing apparatus 101 and the communication apparatus 151 is not limited to this example, and may be performed in another configuration.

In the present exemplary embodiment, the information processing apparatus 101 stores a predetermined application in the ROM 104, the external storage device 106, or the like. The predetermined application is, for example, an application program for transmitting a print job for printing image data, text data, or the like stored in the information processing apparatus 101 to the communication apparatus 151. The application having such a function is hereinafter referred to as a printing application. The printing application may also include functions other than the printing function. For example, in a case where the communication apparatus 151 includes a scanning function, the printing application may include a function for causing the communication apparatus 151 to scan a set document, a function for making other settings for the communication apparatus 151, and a function for checking the state of the communication apparatus 151. In other words, the printing application may also include a function for transmitting not only a print job, but also a scanning job or a setting job to the communication apparatus 151. The predetermined application is not limited to the printing application, and may be an application program including a function other than the printing function.

Figure 2:
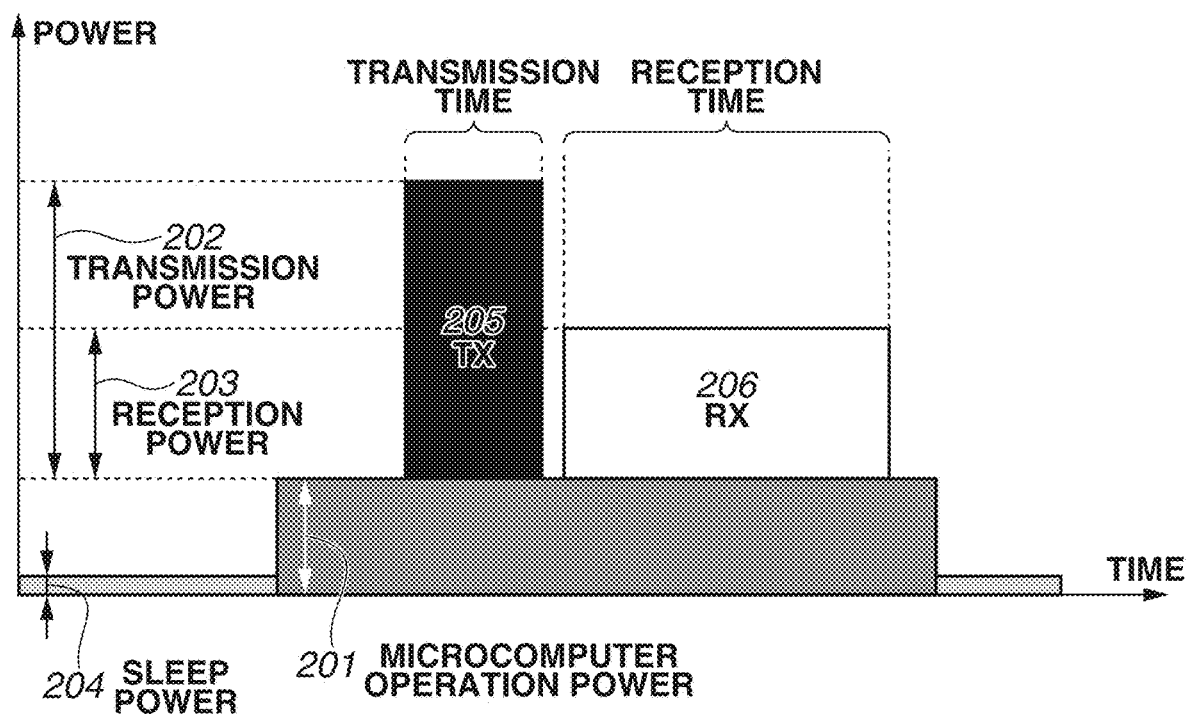
FIG. 2 is a diagram illustrating processing for broadcasting advertising information and receiving connection request information.

In the present exemplary embodiment, assume that the short-range wireless communication unit 110 and the short-range wireless communication unit 157 communicate with each other through Bluetooth® Low Energy. In the present exemplary embodiment, the short-range wireless communication unit 157 functions as an advertiser (or slave) that broadcasts advertising information to be described below at predetermined intervals, and the short-range wireless communication unit 110 functions as a scanner (or master) that receives the advertising information. The present exemplary embodiment is described assuming that the communication unit 109 and the communication unit 156 communicate with each other through wireless LAN (Wi-Fi®). Processing for transmitting advertising information based on Bluetooth® Low Energy standards and receiving a Bluetooth® Low Energy connection request will now be described. In the present exemplary embodiment, since the short-range wireless communication unit 157 operates as a slave device as described above, the short-range wireless communication unit 157 performs the above-described processing. The short-range wireless communication unit 157 divides a frequency band of 2.4 GHz into 40 channels (0 to 39 channel), and performs communication using these channels. The short-range wireless communication unit 157 uses 37th to 39th channels to transmit the advertising information and to receive the Bluetooth® Low Energy connection request, and uses 0th to 36th channels for data communication after the Bluetooth® Low Energy connection is established. In FIG. 2, the vertical axis represents power consumption in the short-range wireless communication unit 157, and the horizontal axis represents time. FIG. 2 illustrates the power consumption for each processing operation when advertising information is to be transmitted using one channel. Tx 205 indicates the total power consumption in transmission processing, which is processing for broadcasting advertising information, and Rx 206 indicates the total power consumption in reception processing, which is processing performed to enable a reception device to receive the Bluetooth® Low Energy connection request. A transmission power 202 indicates instantaneous power consumption by transmission processing. A reception power 203 indicates instantaneous power consumption by reception processing. A microcomputer operation power 201 indicates instantaneous power consumption when a microcomputer in the short-range wireless communication unit 157 is operating. The microcomputer is operating before and after the periods of Tx 205 and Rx 206, as well as during these periods. This is because the microcomputer needs to be activated to execute or stop the transmission or reception processing. In a case of transmitting advertising information using a plurality of channels, the power consumption is increased by the amount corresponding to the number of channels used to transmit advertising information. In addition, while the microcomputer is not operating and the short-range wireless communication unit 157 is in a power saving state, a sleep power 204 is used as instantaneous power consumption in the short-range wireless communication unit 157. In this way, the short-range wireless communication unit 157 performs transmission processing using a predetermined channel, and then performs reception processing for a certain time period using the same channel, and waits for the Bluetooth® Low Energy connection request to be transmitted from the information processing apparatus 101.

Figure 3:
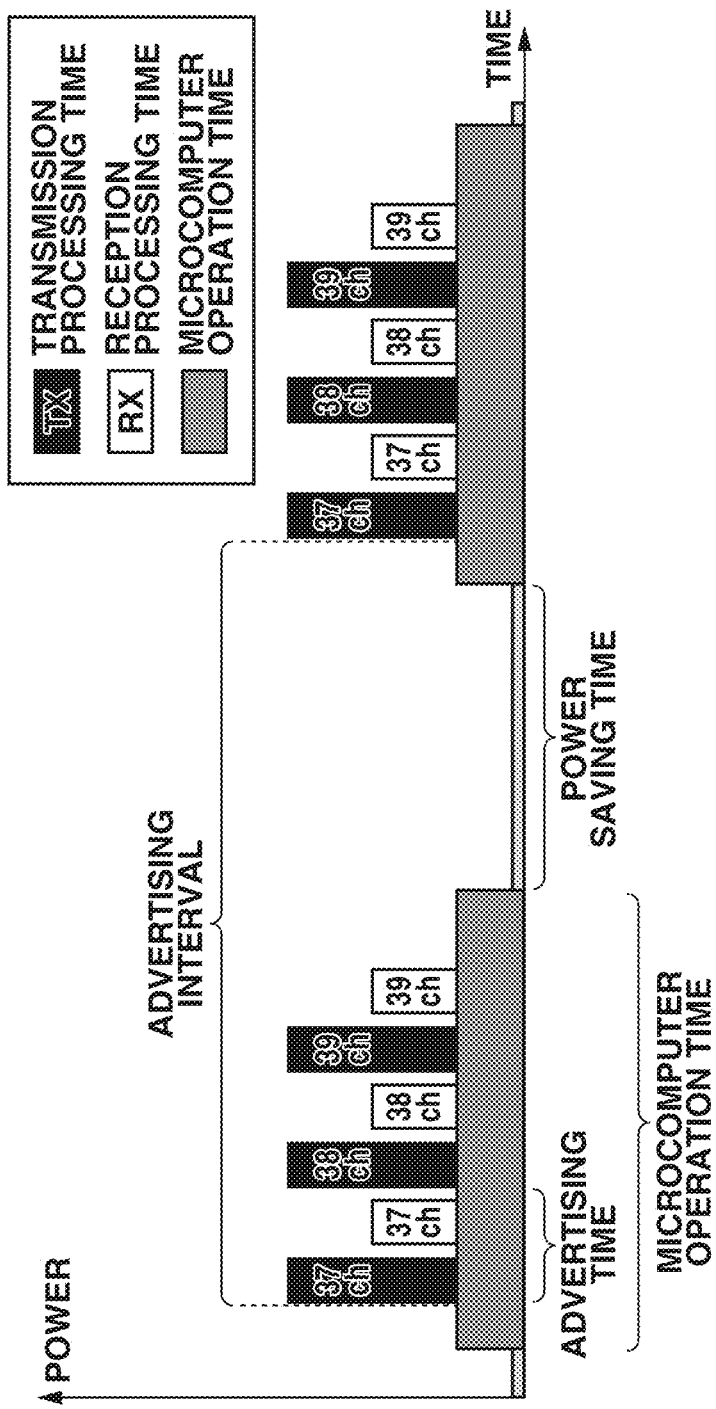
FIG. 3 is a diagram illustrating advertising in Bluetooth® Low Energy.

As illustrated in FIG. 3, the short-range wireless communication unit 157 repeats transmission processing and reception processing on advertising information three times for each channel, and then stops the operation of the microcomputer and shifts to the power saving state for a predetermined time. The combination of advertising information transmission processing and advertising information reception processing to be performed using the predetermined channel is hereinafter referred to as advertising. A time interval for transmitting advertising information using the predetermined channel is referred to as an advertising interval. The number of advertising operations to be repeated after the first advertising operation is performed until the operation state is shifted to the power saving state can be arbitrarily changed as long as the number of advertising operations is three or less. In FIG. 3, the 37th, 38th, and 39th channels are used in this order during advertising. However, the channels may be randomly used and the order of the channels to be used may be changed in each of the first, second, third, and the subsequent advertising operations.

Figure 9:
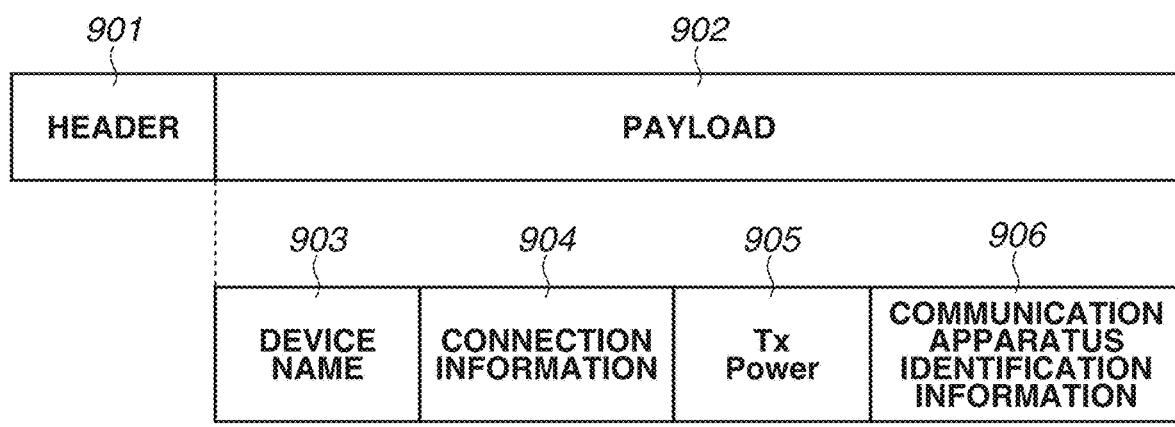
FIG. 9 is a diagram illustrating a structure of advertising information.

FIG. 9 illustrates an example of a structure of advertising information to be broadcasted, in the vicinity of the communication apparatus 151, by the short-range wireless communication unit 157.

The short-range wireless communication unit 157 performs initialization processing when the supply of power is started, and then shifts to an advertising state. In the advertising state, the short-range wireless communication unit 157 periodically broadcasts, in the vicinity of the communication apparatus 151, advertising information based on the advertising interval. The advertising information is a signal including basic header information (e.g., identification information for identifying an apparatus that transmits the advertising information), and is composed of a header 901 and a payload 902. The information processing apparatus 101 receives the advertising information, which makes it possible to recognize the presence of the communication apparatus 151. Further, the information processing apparatus 101 can be connected to the communication apparatus 151 through Bluetooth® Low Energy by transmitting the Bluetooth® Low Energy connection request to the communication apparatus 151. The header 901 is an area in which information such as the type of advertising information and the size of the payload 902 is stored. The payload 902 stores information such as identification information, including a device name 903 and loading profile information, connection information 904 for establishing a Bluetooth® Low Energy connection with the communication apparatus 151, and transmission power (Tx Power) 905 for transmitting advertising information. Identification information 906 about the communication apparatus 151 may also be included in the advertising information. The identification information 906 about the communication apparatus is, for example, a media access control (MAC) address of the communication apparatus 151, service information about the communication apparatus 151, a service set identifier (SSID) of an access point in the communication apparatus 151, or a password.

In the present exemplary embodiment, assume that the short-range wireless communication unit 157 shifts to the advertising state when the communication apparatus 151 is powered on, and starts transmission of advertising information. However, the timing when the short-range wireless communication unit 157 starts transmission of advertising information is not limited to the above-described timing. For example, the transmission of advertising information may be started at a timing when a predetermined operation for enabling the Bluetooth® Low Energy function is executed.

For example, in a case where the short-range wireless communication unit 157 transmits first advertising information and receives a scan response corresponding to the first advertising information from the information processing apparatus 101, the short-range wireless communication unit 157 may transmit second advertising information with a content different from that of the first advertising information. For example, the first advertising information includes information about transmission power for transmitting advertising information, and identification information about the short-range wireless communication unit 157. The second advertising information includes identification information about the communication apparatus 151, and information about functions and hardware included in the communication apparatus 151. In this configuration, for example, the printing application is designed to handle the second advertising information. Accordingly, in the following description, assume that the second advertising information is handled by the printing application.

An outline of Generic Attribute Profile (GATT) communication based on Bluetooth® Low Energy standards will now be described. The GATT refers to a profile for reading and writing (transmitting and receiving) information based on Bluetooth® Low Energy standards.

In the GATT communication, two roles, i.e., a GATT client and a GATT server, are defined based on a data transfer source and a data transfer destination.

The GATT client transmits a request to the GATT server, and receives a response from the GATT server. In the present exemplary embodiment, the information processing apparatus 101 serves as the GATT client. The GATT client can read information held in a storage area in the short-range wireless communication unit of the GATT server, and can write information into the storage area.

Upon receiving a request from the GATT client, the GATT server returns a response to the GATT client. In the present exemplary embodiment, the communication apparatus 151 serves as the GATT server and the information processing apparatus 101 serves as the GATT client. The GATT server operates as a device that stores information such as state information about the GATT server.

Next, a GATT data format will be described. GATT data has a hierarchical structure as illustrated in FIG. 10 and is composed of three elements called "service", "characteristic", and "descriptor". However, GATT data may include no descriptor. In the present exemplary embodiment, assume that the GATT data configured by the short-range wireless communication unit 157 includes no descriptor. Each of the elements "service", "characteristic", and "descriptor" can be identified by a universally unique identifier (UUID) represented by 32 digits. The UUID described herein is used as an identifier for uniquely identifying an object on software. The UUID, which is a 128-bit value, is generally represented in hexadecimal notation, like 550e8400-e29b-41d4-a716-446655440000. For example, some of the elements "service", "characteristic", and "descriptor" are defined in Bluetooth® Special Internet Group (SIG) standards, or are unique to a vendor. The UUID for each element unique to a vendor is represented by 32 digits as described above, and the UUID for each element defined in Bluetooth® SIG standards is represented by four digits. Specifically, the UUID for each element defined in Bluetooth® SIG standards is represented as, for example, 2A49.

The element "service" is obtained by grouping attributes in GATT data for each common section, and each service includes one or more characteristics. A single value is set for each characteristic. An attribute value used when additional information is required for the characteristic is set for the descriptor. For each of the elements "service", "characteristic", and "descriptor", a read/write attribute can be set as a setting value indicating whether to allow the GATT client to perform read or write processing.

The GATT client can perform read or write processing on the value set for the designated characteristic by designating the UUID for each of the elements "service" and "characteristic". However, whether read or write processing can be executed is based on the read/write attribute set for each of the elements "service" and "characteristic".

FIG. 11 illustrates an example of GATT data constructed by the short-range wireless communication unit 157. In the GATT data illustrated in FIG. 11, "Service UUID" indicates the UUID allocated to each service. "Service Name" indicates the name of each service. "Characteristic UUID" indicates the UUID allocated to each characteristic. "Characteristic Name" indicates the name of each characteristic. "Service Readable" indicates whether the information processing apparatus 101 can read a value relating to each service. "Service Writable" indicates whether the information processing apparatus 101 can write a value relating to each service. "Characteristic Readable" indicates whether the information processing apparatus 101 can read a value relating to each characteristic. "Characteristic Writable" indicates whether the information processing apparatus 101 can write a value relating to each characteristic. "Characteristic Indicatable" indicates whether a value relating to each characteristic can be indicated (notified) to the information processing apparatus 101 when the communication apparatus 151 is updated. "Pairing Required" indicates whether to prohibit the information processing apparatus 101 from writing or reading the value relating to each characteristic if pairing is not established. In a case where "Service Readable" indicates "readable (o)" and "Characteristic Readable" indicates "readable (o)", the information processing apparatus 101 can read the value relating to the corresponding characteristic. In a case where "Service Readable" indicates "readable (o)" and "Characteristic Readable" indicates "not readable (blank)", the information processing apparatus 101 cannot read the value relating to the corresponding characteristic. "Value" indicates a value set for each characteristic. In a case where "Pairing Required" indicates "not required (blank)", the information processing apparatus 101 can read or write the value relating to the corresponding characteristic even in a state where the information processing apparatus 101 is not paired with the communication apparatus 151. On the other hand, in a case where "Pairing Required" indicates "required (o)", the information processing apparatus 101 cannot read or write the value relating to the corresponding characteristic if the information processing apparatus 101 is not paired with the communication apparatus 151.

To establish GATT communication with the communication apparatus 151 through Bluetooth® Low Energy, the information processing apparatus 101 needs to recognize information about the structure of GATT data held in the communication apparatus 151 (this information is hereinafter referred to as GATT configuration data). Examples of the GATT configuration data include the number of services in GATT data, the number of characteristics in GATT data, the value of each UUID, and an attribute indicating whether to allow read processing. The GATT configuration data does not include the value of each characteristic. Processing for acquiring the GATT configuration data held in the communication apparatus 151 is referred to as service discovery.

Incidentally, it takes a certain time to complete service discovery (i.e., all the GATT configuration data held in the communication apparatus 151 is acquired by the information processing apparatus 101). In the present exemplary embodiment, for example, in a case where a print data transmission instruction is sent to the communication apparatus 151 from the user, the information processing apparatus 101 establishes GATT communication with the communication apparatus 151 through Bluetooth® Low Energy. Every time the information processing apparatus 101 attempts to establish GATT communication with the communication apparatus 151 through Bluetooth® Low Energy in response to an instruction from the user, it takes a certain time for the GATT communication to be executed in response to the instruction from the user in the configuration in which service discovery is completed.

Accordingly, in the present exemplary embodiment, the information processing apparatus 101 does not complete service discovery in a case where service discovery is already completed and the GATT configuration data held in the communication apparatus 151 is recognized. Further, in the present exemplary embodiment, the information processing apparatus 101 automatically completes first service discovery processing without receiving an instruction to execute service discovery from the user. In this way, in a case where the information processing apparatus 101 attempts to establish GATT communication with the communication apparatus 151 through Bluetooth® Low Energy in response to the instruction from the user, the GATT communication can be promptly started in response to the instruction from the user.

FIG. 12 is a sequence diagram illustrating processing for caching GATT configuration data between the information processing apparatus 101 and the communication apparatus 151. The processing to be performed by the communication apparatus 151 as illustrated in the processing sequence is implemented by the CPU 154 loading a control program stored in the ROM 152 or the HDD (not illustrated) included in the communication apparatus 151 into the RAM 153 and executing the control program. The processing to be performed by the information processing apparatus 101 is implemented by the CPU 103 loading a control program stored in the ROM 104 or the HDD (not illustrated) included in the information processing apparatus 101 into the RAM 105 and executing the control program. The processing to be performed by the information processing apparatus 101 is automatically executed when the printing application is activated in the information processing apparatus 101. In other words, when the printing application is activated, the information processing apparatus 101 starts reception of advertising information by the printing application.

In the following description, assume that the communication apparatus 151 is an advertiser and the information processing apparatus 101 is a scanner.

In steps S201 to S1203, the short-range wireless communication unit 157 in the communication apparatus 151 transmits advertising information. Upon receiving the advertising information transmitted from the short-range wireless communication unit 157, the information processing apparatus 101 recognizes the presence of the communication apparatus 151. The information processing apparatus 101 may determine whether to execute the processing of step S1204 and subsequent steps in a case where advertising information is received in steps S1201 to S1203. In other words, the information processing apparatus 101 need not analyze all the received advertising information in step S1204 and subsequent steps. More specifically, the information processing apparatus 101 determines whether the advertising information includes information corresponding to the printing application. Examples of the information corresponding to the printing application include information indicating that the apparatus that has transmitted the advertising information includes the printing function, and information indicating a vendor that provides the printing application. Examples of the information corresponding to the printing application also include information indicating that the apparatus that has transmitted the advertising information is a type of apparatus that can issue a print instruction using the printing application. When the information processing apparatus 101 receives advertising information and recognizes the communication apparatus 151, the information processing apparatus 101 acquires individual identification information included in the received advertising information. In the present exemplary embodiment, a unique address for identifying a Bluetooth®-compatible device (the address is referred to as a Bluetooth® device (BD) address) is used as the individual identification information. However, the individual identification information is not limited to this example. For example, the MAC address, serial number, device name, and model number of the communication apparatus 151, and information based on a format unique to the vendor may also be used.

In step S1204, the information processing apparatus 101 determines whether the apparatus that has transmitted the advertising information acquired in steps S1201 to S1203 is an apparatus corresponding to the GATT configuration data acquired by the information processing apparatus 101. An example of the apparatus corresponding to the GATT configuration data acquired by the information processing apparatus 101 is an apparatus with which the information processing apparatus 101 has previously established a connection through Bluetooth® Low Energy. Another example of the apparatus corresponding to the acquired GATT configuration data is an apparatus that is different from the apparatus with which the information processing apparatus 101 has previously established a connection through Bluetooth® Low Energy and includes the same identification information as the identification information included in the apparatus with which the information processing apparatus 101 has previously established a connection through Bluetooth® Low Energy. Examples of the identification information include a model number, a name, a vendor name, a service name, and a MAC address. Specifically, in step S1204, the information processing apparatus 101 compares the individual identification information newly acquired as described above with the individual identification information that is stored in a memory (ROM 104 or the like) included in the information processing apparatus 101 and is already acquired from the apparatus corresponding to the GATT configuration data acquired by the information processing apparatus 101. If the two pieces of individual identification information match as a result of comparison, the result of the determination processing in step S204 indicates "YES". In this case, service discovery for the apparatus that has transmitted the advertising information acquired in steps S1201 to S1203 (or an apparatus corresponding to the apparatus) is already executed. Accordingly, the processing is terminated without newly executing service discovery. On the other hand, if the two pieces of individual identification information do not match, the result of the determination processing in step S1204 indicates "NO" and the processing of step S1205 and subsequent steps is executed. The newly acquired individual identification information may be a BD address randomly generated in the communication apparatus 151. In this case, the determination processing in step S1204 may be executed based on whether the acquired BD address can be decoded using a key called an Identity Resolution Key (IRK) that is stored in the memory included in the information processing apparatus 101. If the BD address can be decoded, the result of the determination processing in step S1204 indicates "YES". If the BD address cannot be decoded, the result of the determination processing in step S1204 indicates "NO".

In step S1205, the information processing apparatus 101 executes processing for establishing a connection through Bluetooth® Low Energy with the apparatus (communication apparatus 151 in this case) that is determined not to be the apparatus with which the information processing apparatus 101 has previously established a connection through Bluetooth® Low Energy. More specifically, the short-range wireless communication unit 110 transmits CONNECT_REQ as a request for shifting to a connection event for establishing a network connection through Bluetooth® Low Energy. When the short-range wireless communication unit 157 receives CONNECT_REQ, the information processing apparatus 101 and the communication apparatus 151 prepare for shifting to the connection event. More specifically, the short-range wireless communication unit 110 and the short-range wireless communication unit 157 notify the CPU 103 and the CPU 154, respectively, of completion of connection processing for GATT communication.

Then, the information processing apparatus 101 and the communication apparatus 151 shift from the scanner and the advertiser to the master and the slave, respectively. The information processing apparatus 101 serving as the master and the communication apparatus 151 serving as the slave establish a connection (Bluetooth® Low Energy connection) for GATT communication.

As described above, before accessing the GATT data held in the communication apparatus 151 through GATT communication, the information processing apparatus 101 needs to recognize the structure of GATT data included in the communication apparatus 151.

Accordingly, after the Bluetooth® Low Energy connection is established in step S1205, in step S1206, the information processing apparatus 101 starts service discovery. More specifically, the information processing apparatus 101 transmits a discovery request for requesting GATT configuration data held in the communication apparatus 151 to the communication apparatus 151. In response to the discovery request, the communication apparatus 151 transmits a part of the GATT configuration data to the information processing apparatus 101. Based on the received part of the GATT configuration data, the information processing apparatus 101 identifies an area in which a predetermined type of information called a hash value is stored in the GATT data held in the communication apparatus 151, and reads the hash value. The hash value is a value stored in Database Hash Characteristic corresponding to the characteristic UUID "0x2B2A" illustrated in FIG. 11. The communication apparatus 151 stores the hash value, which is preliminarily calculated by the communication apparatus 151 based on the configuration of GATT data, as the value of Database Hash Characteristic. The hash value is a value uniquely determined based on the configuration of GATT data held in the communication apparatus 151.

The information processing apparatus 101 stores the hash value read from the apparatus with which the information processing apparatus 101 has previously established a connection through Bluetooth® Low Energy in the memory (e.g., ROM 104) included in the information processing apparatus 101. Accordingly, in step S207, the information processing apparatus 101 determines whether the hash value read in step S1206 matches any one of the previously-read hash values (hash values stored in the memory included in the information processing apparatus 101). Thus, the information processing apparatus 101 determines whether the communication apparatus 151 is a terminal with which the information processing apparatus 101 has previously established a connection through Bluetooth® Low Energy. In this case, the information processing apparatus 101 may use not only the hash value, but also other information, including individual identification information such as the BD address of the communication apparatus 151, as determination conditions.

If the determination result in step S207 indicates "NO", the information processing apparatus 101 continues service discovery to recognize the rest of the GATT configuration data held in the communication apparatus 151. Accordingly, in step S1208, the information processing apparatus 101 transmits a discovery request for requesting the GATT configuration data held in the communication apparatus 151 to the communication apparatus 151. In step S209, the communication apparatus 151 that has received the discovery request transmits the rest of the GATT configuration data to the information processing apparatus 101. Transmission and reception of the discovery request and transmission and reception of GATT configuration data are repeated by the number of times corresponding to the number of elements "service", "characteristic", and "descriptor" in the GATT data. Accordingly, in step S1210, transmission and reception of the discovery request and transmission and reception of GATT configuration data are repeated until transmission of all GATT configuration data is completed.

After the transmission of all GATT configuration data is completed, in step S1211, the information processing apparatus 101 stores, as a cache, the GATT configuration data held in the communication apparatus 151 in the memory included in the information processing apparatus 101. In this case, the information processing apparatus 101 associates the cache of the GATT configuration data of the communication apparatus 151 with the hash value obtained from the communication apparatus 151 and stores the GATT configuration data and the hash value in the memory. Further, the information processing apparatus 101 may associate other information, including the individual identification information such as the MAC address of the communication apparatus 151 to store the information in the memory. Furthermore, the information processing apparatus 101 may associate information about a time when data is cached to store the information. Service discovery, which does not include processing for acquiring the value of each characteristic, can be executed even in a state where pairing between the information processing apparatus 101 and the communication apparatus 151 is not executed.

If the determination result in step S1207 indicates "YES", the information processing apparatus 101 has already cached the GATT configuration data of the communication apparatus 151, and thus the processing of steps S1208 to S1211 is omitted. In other words, the information processing apparatus 101 interrupts the processing without completing service discovery.

The acquisition of the GATT configuration data held in the communication apparatus 151 enables the information processing apparatus 101 to execute any GATT communication with the communication apparatus 151 in the subsequent processing. Accordingly, in step S1212, the information processing apparatus 101 executes any GATT communication with the communication apparatus 151.

After completion of GATT communication, in step S1213, the information processing apparatus 101 transmits a release request. In step S1214, the communication apparatus 151 that has received the release request transmits a release response, and then terminates the Bluetooth® Low Energy connection with the information processing apparatus 101. When the Bluetooth® Low Energy connection between the information processing apparatus 101 and the communication apparatus 151 is terminated, the information processing apparatus 101 and the communication apparatus 151 return to their original functions, i.e., the scanner and the advertiser, respectively, and the communication apparatus 151 resumes transmission of advertising information.

Figure 4:
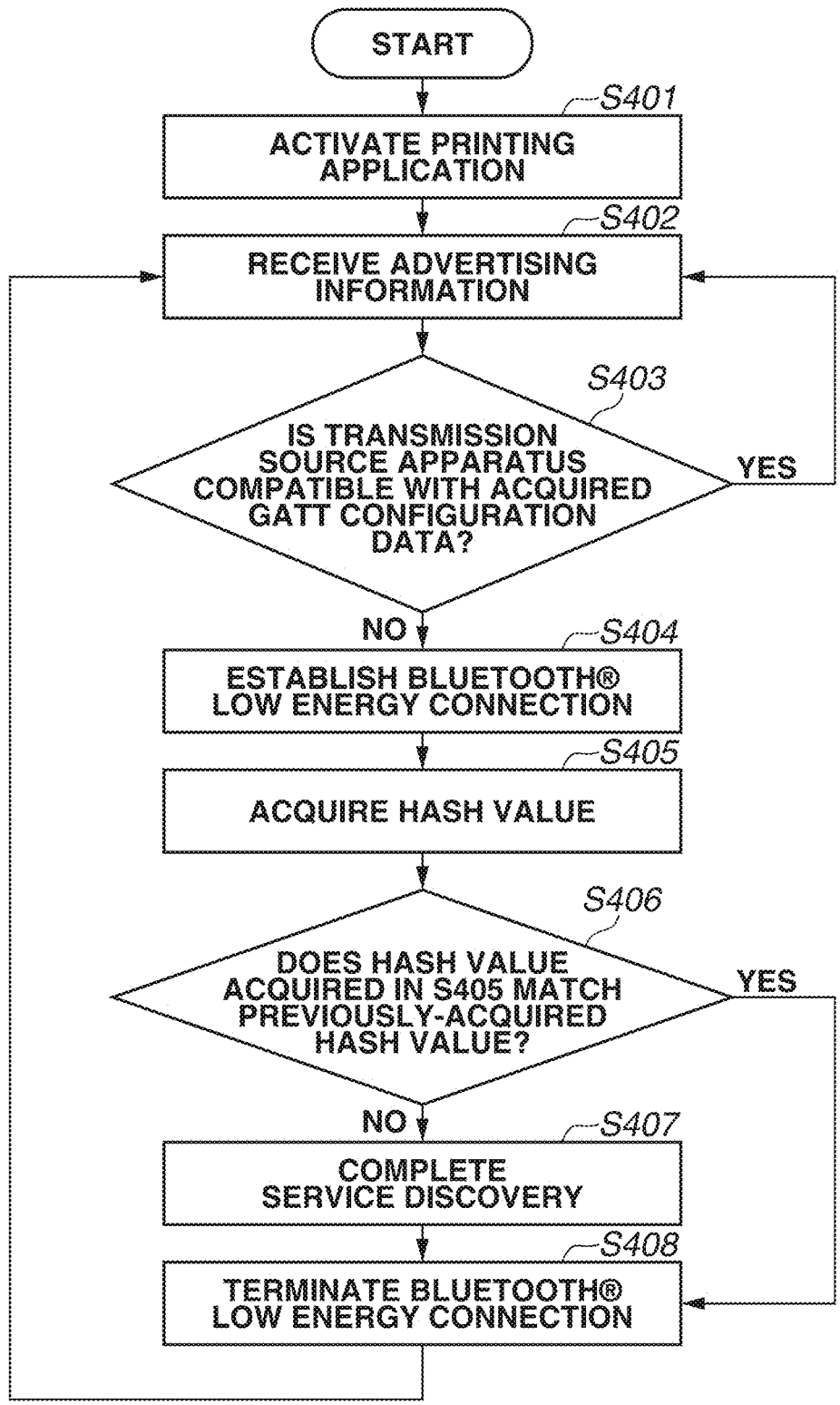
FIG. 4 is a flowchart illustrating processing for caching Generic Attribute Profile (GATT) configuration data.

FIG. 4 is a flowchart illustrating GATT configuration data caching processing to be executed by the information processing apparatus 101. This processing is implemented by the CPU 103 loading a control program and a printing application stored in the ROM 104 or the HDD (not illustrated) included in the information processing apparatus 101 into the RAM 105 and executing these programs. This processing is started in response to an instruction to activate the printing application in the information processing apparatus 101.

In step S401, the CPU 103 activates the printing application in foreground.

In step S402, the CPU 103 receives advertising information.

In step S403, the CPU 103 determines whether the apparatus that has transmitted the received advertising information is an apparatus corresponding to the GATT configuration data acquired by the information processing apparatus 101. If the CPU 103 determines that the apparatus that has transmitted the received advertising information does not correspond to the acquired GATT configuration data (NO in step S403), the processing proceeds to step S404. If the CPU 103 determines that the apparatus that has transmitted the received advertising information corresponds to the acquired GATT configuration data (YES in step S403), the processing returns to step S402. In step S402, the CPU 103 waits for reception of adverting information from another apparatus without executing service discovery to the apparatus that has transmitted the received advertising information. This processing corresponds to the processing of step S1204.

In step S404, the CPU 103 establishes a Bluetooth® Low Energy connection with the apparatus that has transmitted the received advertising information, and starts service discovery. This processing corresponds to the processing of step S1205.

In step S405, the CPU 103 acquires a hash value from the apparatus that has transmitted the received advertising information. This processing corresponds to the processing of step S1206.

In step S406, the CPU 103 determines whether the hash value acquired in step S405 matches the previously-acquired hash value. If the CPU 103 determines that the hash values do not match (NO in step S406), the processing proceeds to step S407. If the CPU 103 determines that the hash values match (YES in step S406), service delivery for the apparatus that has transmitted the received advertising information is interrupted and the processing proceeds to step S408. This processing corresponds to the processing of step S1207. If there is no hash value already acquired, it is determined that the hash values do not match (NO in step S406).

In step S407, the CPU 103 continues service discovery, acquires the rest of the GATT configuration data, and caches the acquired data. This processing corresponds to the processing of steps S1208 to S1211.

In step S408, the CPU 103 terminates the Bluetooth® Low Energy connection with the apparatus that has transmitted the received advertising information. This processing corresponds to the processing of steps S1213 and S1214. Then, in step S402, the CPU 103 waits for reception of advertising information from another apparatus.

In this way, the information processing apparatus 101 according to the present exemplary embodiment automatically establishes the Bluetooth® Low Energy connection between the information processing apparatus 101 and the communication apparatus 151 without receiving a user operation after the printing application is activated, and automatically executes service discovery. Further, the information processing apparatus 101 automatically caches information about the structure of GATT data of the communication apparatus 151. Accordingly, in the present exemplary embodiment, at least a part of service discovery can be omitted even when an instruction to establish the GATT communication between the information processing apparatus 101 and the communication apparatus 151 is first issued, and thus the GATT communication can be promptly started in response to the instruction from the user.

The timing when the printing application automatically establishes the Bluetooth® Low Energy connection between the information processing apparatus 101 and the communication apparatus 151 and automatically executes service discovery is not limited to the above-described timing. The above-described processing may be executed at any timing before an instruction (e.g., handover instruction) for establishing the Bluetooth® Low Energy connection between the information processing apparatus 101 and the communication apparatus 151 is intentionally issued by the user. For example, the above-described processing may be automatically executed when an instruction to display a screen for selecting an image to be printed is sent to the printing application.

In a case of receiving advertising information from a plurality of apparatuses, the information processing apparatus 101 may execute service discovery for each of the plurality of apparatuses, and may cache information about the structure of GATT data of each of the plurality of apparatuses.

In the present exemplary embodiment, assume that the processing of steps S405 to S407 is executed by the OS of the information processing apparatus 101. More specifically, in step S404, if the printing application sends an instruction to establish the Bluetooth® Low Energy connection to the OS of the information processing apparatus 101, the OS automatically executes the acquisition of a hash value and service discovery. However, the present exemplary embodiment is not limited to this configuration. The processing of steps S405 to S407 may be executed, for example, in response to an instruction from the printing application.

As described above, in the present exemplary embodiment, the printing application causes the information processing apparatus 101 to automatically execute service discovery, and caches information about the structure of GATT data of the communication apparatus 151. In this way, the execution of service discovery can be omitted even when the user issues an instruction to establish the Bluetooth® Low Energy connection between the information processing apparatus 101 and the communication apparatus 151 in the subsequent processing. In addition, the processing to be executed when the Bluetooth® Low Energy connection is established can be promptly started.

In the present exemplary embodiment, a registration function for registering information about the communication apparatus 151 is executed on the printing application as an example of processing to be executed when the Bluetooth® Low Energy connection is established. FIG. 13 is a sequence diagram illustrating the registration function between the information processing apparatus 101 and the communication apparatus 151. The processing to be performed by the communication apparatus 151 illustrated in the processing sequence is implemented by the CPU 154 loading a control program stored in the ROM 152 or the HDD (not illustrated) included in the communication apparatus 151 into the RAM 153 and executing the control program. The processing to be performed by the information processing apparatus 101 is implemented by the CPU 103 loading a control program and a printing application stored in the ROM 104 or the HDD (not illustrated) included in the information processing apparatus 101 into the RAM 105 and executing these programs. Further, the processing to be performed by the information processing apparatus 101 is started in a state where the printing application is activated in the information processing apparatus 101. This processing is started in a state where Bluetooth® Low Energy pairing between the information processing apparatus 101 and the communication apparatus 151 is not executed.

In the following description, assume also that the communication apparatus 151 is an advertiser and the information processing apparatus 101 is a scanner.

In step S301, the information processing apparatus 101 receives an instruction to execute the registration function from the user. More specifically, for example, an operation (e.g., pressing of a button) for instructing execution of the registration function is received from the user on a screen displayed by the printing application. In this way, the information processing apparatus 101 starts reception of advertising information by the printing application.

In steps S1302 to S1304, the short-range wireless communication unit 157 in the communication apparatus 151 transmits advertising information. By the short-range wireless communication unit 110 receiving the advertising information transmitted from the short-range wireless communication unit 157, the information processing apparatus 101 recognizes the presence of the communication apparatus 151. In this case, the information processing apparatus 101 may receive advertising information not only from the communication apparatus 151, but also from an apparatus other than the communication apparatus 151.

In step S1305, the information processing apparatus 101 displays on the display unit 108 a selection screen for receiving selection of a registration function target apparatus. More specifically, the information processing apparatus 101 displays a list of identification information about the apparatus that has transmitted the advertising information received in steps S1302 to S1304 on the display unit 108. The identification information is included in the advertising information. Examples of the identification information include a BD address, a MAC address, an internet protocol (IP) address, a model number, and a model name. The information processing apparatus 101 receives selection of the registration function target apparatus from the user via the selection screen, and the selected apparatus is identified as the registration function target. The following description is made assuming that the communication apparatus 151 is selected as the registration function target. If the information processing apparatus 101 receives advertising information only from a single apparatus during steps S1302 to S1304, this apparatus may be identified as the registration function target, without displaying the selection screen on the display unit 108.

In step S1306, the information processing apparatus 101 executes processing for establishing a connection with the communication apparatus 151 through Bluetooth® Low Energy. More specifically, the short-range wireless communication unit 110 transmits CONNECT_REQ as a request for shifting to a connection event for establishing a network connection through Bluetooth® Low Energy.

Then, the information processing apparatus 101 and the communication apparatus 151 shift from the scanner and the advertiser to the master and the slave, respectively. The information processing apparatus 101 serving as the master and the communication apparatus 151 serving as the slave establish a connection (Bluetooth® Low Energy connection) for GATT communication.

After the Bluetooth® Low Energy connection is established in S1306, in step S1307, the information processing apparatus 101 starts service discovery. More specifically, the information processing apparatus 101 transmits a discovery request for requesting GATT configuration data held in the communication apparatus 151 to the communication apparatus 151. With this request, the communication apparatus 151 transmits a part of the GATT configuration data to the information processing apparatus 101 as a response to the discovery request. Based on the received part of the GATT configuration data, the information processing apparatus 101 determines whether an area in which the hash value is stored in the GATT data of the communication apparatus 151 can be identified. If it is determined that the area can be identified, the information processing apparatus 101 sends a request for information included in the identified area and reads the hash value. On the other hand, if the area cannot be identified, the information processing apparatus 101 repeatedly receives the discovery request and a part of the GATT configuration data until the GATT configuration data with which the area in which the hash value is stored can be identified is received.

The information processing apparatus 101 stores the hash value acquired from a terminal with which the information processing apparatus 101 has previously established a connection through Bluetooth® Low Energy in the memory (e.g., ROM 104) included in the information processing apparatus 101. Accordingly, in step S1308, the information processing apparatus 101 determines whether the hash value read in step S1306 matches the previously acquired cached hash value (hash value stored in the memory included in the information processing apparatus 101). In this case, the information processing apparatus 101 may use not only the hash value, but also other information, including individual identification information such as the MAC address of the communication apparatus 151, as determination conditions.

In the present exemplary embodiment, the information processing apparatus 101 automatically executes service discovery in advance as illustrated in FIG. 12. Accordingly, unless, for example, Bluetooth® Low Energy is activated by the registration target apparatus immediately before the registration function is executed, the information processing apparatus 101 can determine that the hash values match in step S1308, and thus the subsequent processing of service discovery can be omitted. In addition, when the user intentionally executes processing using the Bluetooth® Low Energy connection (executes the registration function through Bluetooth® Low Energy), the information processing apparatus 101 can promptly start the processing without having the user wait for the processing. If it is determined that the hash values do not match in step S1308, the information processing apparatus 101 executes the rest of service discovery as illustrated in FIG. 12. After completion of service discovery, the processing proceeds to step S1309.

The present exemplary embodiment described above illustrates a configuration in which, after the Bluetooth® Low Energy connection is established in step S1306, in step S1307, the information processing apparatus 101 starts service discovery and reads the hash value. A method for starting service discovery and attempting to acquire a hash value as described above is hereinafter referred to as a first acquisition method. However, the present exemplary embodiment is not limited to the configuration for executing the first acquisition method. A configuration for acquiring a hash value by another acquisition method (second acquisition method) will be described in detail below.

In step S1307, the information processing apparatus 101 identifies, based on the cached GATT configuration data, an identifier for identifying the area in which the hash value is included in the GATT data corresponding to the GATT configuration data, without starting service discovery. The identifier is, for example, a handle value. Further, the information processing apparatus 101 directly requests the communication apparatus 151 to send a value included in the area corresponding to the identified identifier, and acquires the value. A method for attempting to acquire a hash value without starting service discovery in this way is referred to as the second acquisition method. In this case, if the communication apparatus 151 includes the same GATT configuration data as the GATT configuration data cached by the information processing apparatus 101, the information processing apparatus 101 acquires the value identical to the cached hash value. On the other hand, if the communication apparatus 151 includes GATT configuration data that is not identical to the GATT configuration data cached by the information processing apparatus 101, the information processing apparatus 101 acquires a value different from the cached hash value. The value acquired in this case may be a hash value different from the cached hash value, or may not be a hash value at all. In step S1308, the information processing apparatus 101 determines whether the information acquired at this time matches the cached hash value. If the information processing apparatus 101 determines that the information matches the cached hash value, the entire service discovery processing can be omitted. On the other hand, if the information processing apparatus 101 determines that the information does not match the cached hash value, service discovery is completed and then the processing proceeds to step S1309. If there is a plurality of pieces of cached GATT configuration data, the information processing apparatus 101 may execute the processing of identifying the identifier based on GATT configuration data and acquiring information based on the identifier by up to the number of times corresponding to the number of pieces of cached GATT configuration data until it is determined that the information matches the cached hash value. Alternatively, if there is a plurality of pieces of cached GATT configuration data, the information processing apparatus 101 may execute the identification processing and acquisition processing described above based only on the GATT configuration data corresponding to the communication apparatus 151 connected through Bluetooth® Low Energy among the plurality of pieces of cached GATT configuration data. In other words, the GATT configuration data corresponding to the communication apparatus 151 connected through Bluetooth® Low Energy is GATT configuration data that is more likely to be the GATT configuration data of the communication apparatus 151 connected through Bluetooth® Low Energy. More specifically, for example, the GATT configuration data is GATT configuration data acquired from an apparatus including the same identifier as the identifier of the communication apparatus 151 connected through Bluetooth® Low Energy. Examples of the identifier include information indicating the name or model name of the apparatus, the vendor of the apparatus, a service provided by the apparatus, or the like. According to this configuration, the entire service discovery processing for the apparatus including the cached GATT configuration data can be omitted. Information acquired by the second acquisition method may be information other than a hash value. For example, the information processing apparatus 101 may identify, based on the cached GATT configuration data, an identifier for identifying an area in which a specific value different from the hash value is included in the GATT data corresponding to the GATT configuration data. Further, the information processing apparatus 101 may directly request the communication apparatus 151 to send a value included in the area corresponding to the identified identifier, and may acquire the value. Furthermore, the information processing apparatus 101 may determine whether the information acquired at this time matches the cached specific value. However, a value other than the hash value can be changed even when the configuration of GATT data is not changed. Accordingly, a hash value is preferably used to execute the determination processing accurately.

The use of the GATT configuration data held in the communication apparatus 151 enables the information processing apparatus 101 to execute any GATT communication with the communication apparatus 151. Accordingly, in step S1309, the information processing apparatus 101 communicates various information through GATT communication based on the GATT configuration data of the communication apparatus 151. More specifically, the information processing apparatus 101 acquires first connection information for establishing a Wi-Fi® connection with the communication apparatus 151 operating in an access point (AP) mode 1, second connection information for establishing a Wi-Fi® connection with the communication apparatus 151 operating in an AP mode 2, identification information about the communication apparatus 151, and the like. The AP mode is a mode in which a predetermined AP in the information processing apparatus 101 is activated and the information processing apparatus 101 operates as the AP. Specific examples of the connection information include an SSID and a password. Examples of the identification information about the communication apparatus 151 include the serial number of the communication apparatus 151, the MAC address of the communication apparatus 151, and the Bonjour name of the communication apparatus 151. The information processing apparatus 101 may acquire the second connection information through Wi-Fi® communication in step S1313 to be described below, instead of using Bluetooth® Low Energy communication in step S309. If pairing between the information processing apparatus 101 and the communication apparatus 151 is not executed, the information processing apparatus 101 may execute paring with the communication apparatus 151 before acquiring various information as described above. After acquiring various information as described above, the information processing apparatus 101 transmits an instruction for causing the communication apparatus 151 to operate in the AP mode 1 to the communication apparatus 151 through GATT communication. With this operation, the communication apparatus 151 starts operation in the AP mode 1. In the present exemplary embodiment, when the communication apparatus 151 operates in the AP mode 1, the Wi-Fi® connection uses a frequency band of 2.4 GHz, but instead a frequency band of 5 GHz may be used.

In step S1310, the information processing apparatus 101 transmits a release request. In step S311, the communication apparatus 151 that has received the release request transmits a release response, and terminates the Bluetooth® Low Energy connection between the information processing apparatus 101 and the communication apparatus 151. After the Bluetooth® Low Energy connection between the information processing apparatus 101 and the communication apparatus 151 is terminated, the information processing apparatus 101 and the communication apparatus 151 return to their original functions, i.e., the scanner and the advertiser, respectively, and the communication apparatus 151 resumes transmission of advertising information. While the configuration in which the Bluetooth® Low Energy connection is terminated after the GATT communication is described above, the present exemplary embodiment is not limited to this configuration. In this case, the processing of steps S1310 and S1311 may be omitted and the Bluetooth® Low Energy connection may be maintained.

In step S1312, the information processing apparatus 101 establishes a Wi-Fi® connection between the information processing apparatus 101 and the communication apparatus 151 operating in the AP mode 1 by using the first connection information acquired in step S1309. Before establishing the Wi-Fi® connection between the information processing apparatus 101 and the communication apparatus 151 operating in the AP mode 1, the information processing apparatus 101 stores the Wi-Fi® setting of the information processing apparatus 101 before the Wi-Fi® connection is established.

In step S1313, the information processing apparatus 101 executes Wi-Fi® communication for registering the communication apparatus 151 on the printing application. More specifically, first, the information processing apparatus 101 acquires information for registering the communication apparatus 151 on the printing application from the communication apparatus 151 via the Wi-Fi® connection. Examples of the information for registering the communication apparatus 151 on the printing application include information about the capability of the communication apparatus 151 and the serial number and MAC address of the communication apparatus 151. Examples of the information about the capability of the communication apparatus 151 include information about a recording medium that can be used for printing by the communication apparatus 151, information indicating whether the communication apparatus 151 can execute double-sided printing, and information indicating whether the communication apparatus 151 can execute color printing. When the communication apparatus 151 is registered on the printing application, a button for receiving a job transmission instruction from the user is enabled. As a result, the information processing apparatus 101 can transmit a job to the communication apparatus 151, which is registered on the printing application, by using the printing application. The printing application can display a print setting screen based on the received information about the capability of the communication apparatus 151. The printing application can generate a print job based on a print setting input on the print setting screen.

Then, in the Wi-Fi® communication, the information processing apparatus 101 transmits an instruction for interrupting the operation in the AP mode 1 to the communication apparatus 151 via the Wi-Fi® connection. Upon receiving the instruction, the communication apparatus 151 interrupts the operation in the AP mode 1 and resets the Wi-Fi® setting of the communication apparatus 151 to the state before operating in the AP mode 1. In this case, the information processing apparatus 101 also resets the Wi-Fi® setting of the information processing apparatus 101 to the state before establishment of the Wi-Fi® connection in step S312. More specifically, the CPU 103 resets the Wi-Fi® connection destination of the information processing apparatus 101 to the connection destination before establishment of the Wi-Fi® connection in step S1312 based on the information stored in step S1312. If another Wi-Fi® connection is not established before the Wi-Fi® connection is established in step S1312, the information processing apparatus 101 simply disconnects the Wi-Fi® connection between the communication apparatus 151 and the information processing apparatus 101.

In this manner, the communication apparatus 151 with which communication is established is registered on the printing application, thereby enabling the information processing apparatus 101 to transmit a job to the communication apparatus 151 with which communication is established in the subsequent processing. The communication apparatus 151 starts operation in the AP mode 2 by the registration function. Accordingly, in a case where the user sends an instruction to transmit a job, the information processing apparatus 101 establishes the Wi-Fi® connection with the communication apparatus 151 operating in the AP mode 2 by using the second connection information, and transmits the job to the communication apparatus 151 via the Wi-Fi® connection.

Figure 5:
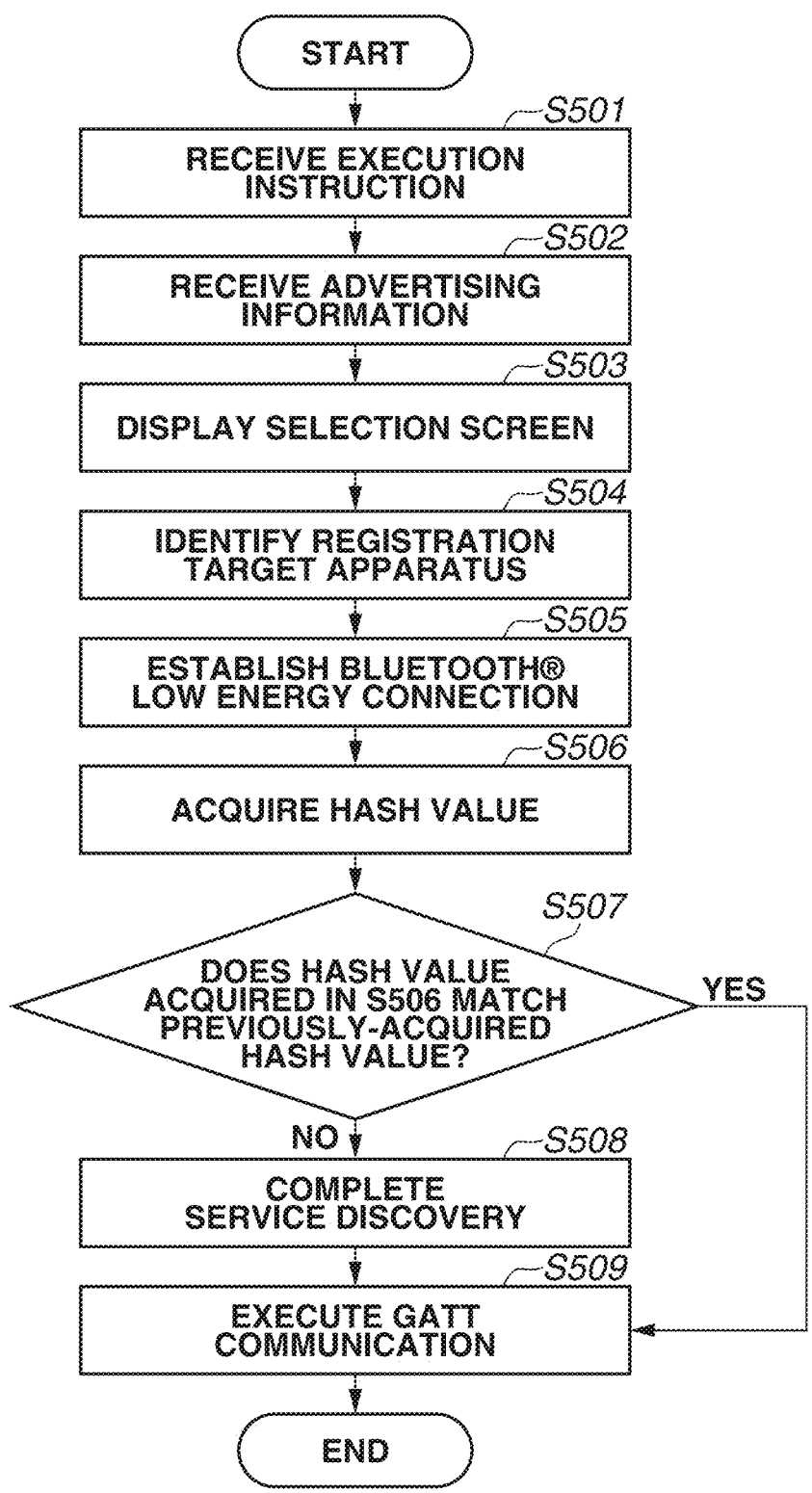
FIG. 5 is a flowchart illustrating a registration function.

FIG. 5 is a flowchart illustrating a registration function to be executed by the information processing apparatus 101. This processing is implemented by the CPU 103 loading a control program and a printing application stored in the ROM 104 or the HDD (not illustrated) included in the information processing apparatus 101 into the RAM 105 and executing these programs. This processing is started in a state where the printing application is activated in the information processing apparatus 101. Further, this processing is started in a state where pairing between the information processing apparatus 101 and the communication apparatus 151 through Bluetooth® Low Energy is not executed.

In step S501, the CPU 103 receives a registration function execution instruction from the user. This processing corresponds to the processing of step S1301.

In step S502, the CPU 103 receives advertising information. In this case, the information processing apparatus 101 may receive advertising information not only from the communication apparatus 151, but also from an apparatus other than the communication apparatus 151. This processing corresponds to the processing of steps S1302 to S1304.

In step S503, the CPU 103 displays a selection screen for receiving selection of the registration function target apparatus on the display unit 108. This processing corresponds to the processing of step S1305.

In step S504, the CPU 103 identifies the registration function target apparatus based on an input on the selection screen.

In step S505, the CPU 103 establishes a Bluetooth® Low Energy connection with the registration function target apparatus identified in step S504, and starts service discovery. This processing corresponds to the processing of step S1306.

In step S506, the CPU 103 acquires a hash value from the registration function target apparatus identified in step S504. This processing corresponds to the processing of step S1307.

In step S507, the CPU 103 determines whether the hash value acquired in step S506 matches the previously-acquired hash value. If the hash values do not match (NO in step S507), the processing proceeds to step S508. If the hash values match (YES in step S507), service discovery for the registration function target apparatus identified in step S504 is interrupted and the processing proceeds to step S509. This processing corresponds to the processing of step S1308.

In step S508, the CPU 103 continues service discovery, acquires the rest of the GATT configuration data, and caches the acquired data.

In step S509, the CPU 103 executes the registration function based on the GATT configuration of the registration function target apparatus identified in step S504. This processing corresponds to the processing of steps S1309 to S313.

In this manner, in the present exemplary embodiment, the information processing apparatus 101 automatically executes service discovery in advance. Accordingly, in the function including GATT communication, such as the registration function, at least a part of service discovery can be omitted even in a state where pairing between the information processing apparatus 101 and the communication apparatus 151 through Bluetooth® Low Energy is not executed. Thus, the function including GATT communication can be promptly executed.

While, in the present exemplary embodiment described above, the registration function is described as an example of the function including GATT communication, the present exemplary embodiment is not limited to this example. Any function may be used as long as the function can perform GATT communication in response to an instruction from the user.

For example, a handover function may be executed as the function including GATT communication. The handover function is processing to be executed when an instruction to transmit a job is issued from the user. In the handover function, the information processing apparatus 101 establishes a Bluetooth® Low Energy connection with the communication apparatus 151, and receives information (e.g., the first connection information described above) for establishing a Wi-Fi® connection with the communication apparatus 151 through GATT communication. Further, the information processing apparatus 101 establishes a Wi-Fi® connection with the communication apparatus 151 by using the received information, and transmits the job to the communication apparatus 151 via the Wi-Fi® connection. Thus, also in the handover function, service discovery can be omitted by applying the present exemplary embodiment thereto.

For example, a Wi-Fi® setup function may be executed as the function including GATT communication. In the Wi-Fi® setup function, the information processing apparatus 101 establishes a Bluetooth® Low Energy connection with the communication apparatus 151, and transmits information for establishing a Wi-Fi® connection with an external access point to the communication apparatus 151 through GATT communication. In this way, the communication apparatus 151 establishes the Wi-Fi® connection with the external access point by using the information. In this case, the external access point to be connected with the communication apparatus 151 may be an external access point to be connected with the information processing apparatus 101 via Wi-Fi® connection, or may be an access point selected from a list of external access points that can be connected with the communication apparatus 151. In the latter case, the information processing apparatus 101 acquires, via GATT communication, the list of external access points that can be connected with the communication apparatus 151, and displays the acquired list on the display unit 108 to receive selection. Also, in the Wi-Fi® setup function, at least a part of service discovery can be omitted by applying the present exemplary embodiment.

In the present exemplary embodiment, assume that the processing of steps S506 to S508 is executed by the OS of the information processing apparatus 101. More specifically, in step S505, if the printing application instructs the OS of the information processing apparatus 101 to establish the Bluetooth® Low Energy connection, the OS automatically executes the acquisition of a hash value and service discovery. However, the present exemplary embodiment is not limited to this configuration. The processing of steps S506 to S508 may be executed, for example, based on an instruction from the printing application.

As described above, in the processing for automatically acquiring GATT configuration data, upon receiving advertising information, the information processing apparatus 101 determines whether GATT configuration data is already acquired from the apparatus that has transmitted the advertising information. Further, if GATT configuration data is already acquired from the apparatus that has transmitted the advertising information, the information processing apparatus 101 does not acquire a hash value and GATT configuration data. However, in the communication apparatus 151, the structure of GATT data may be changed by firmware update or the like. If the structure of GATT data is changed, information cached in the information processing apparatus 101 cannot be used any more. Further, if a certain time has elapsed after GATT configuration data is cached, it is highly likely that the structure of GATT data is changed. Accordingly, a second exemplary embodiment illustrates a configuration in which, if a certain time has elapsed after the GATT configuration data is cached, acquisition of a hash value and caching of GATT configuration data are executed again. Unless otherwise described, the configuration of the communication system according to the second exemplary embodiment is similar to the configuration of the communication system according to the first exemplary embodiment.

Figure 6:
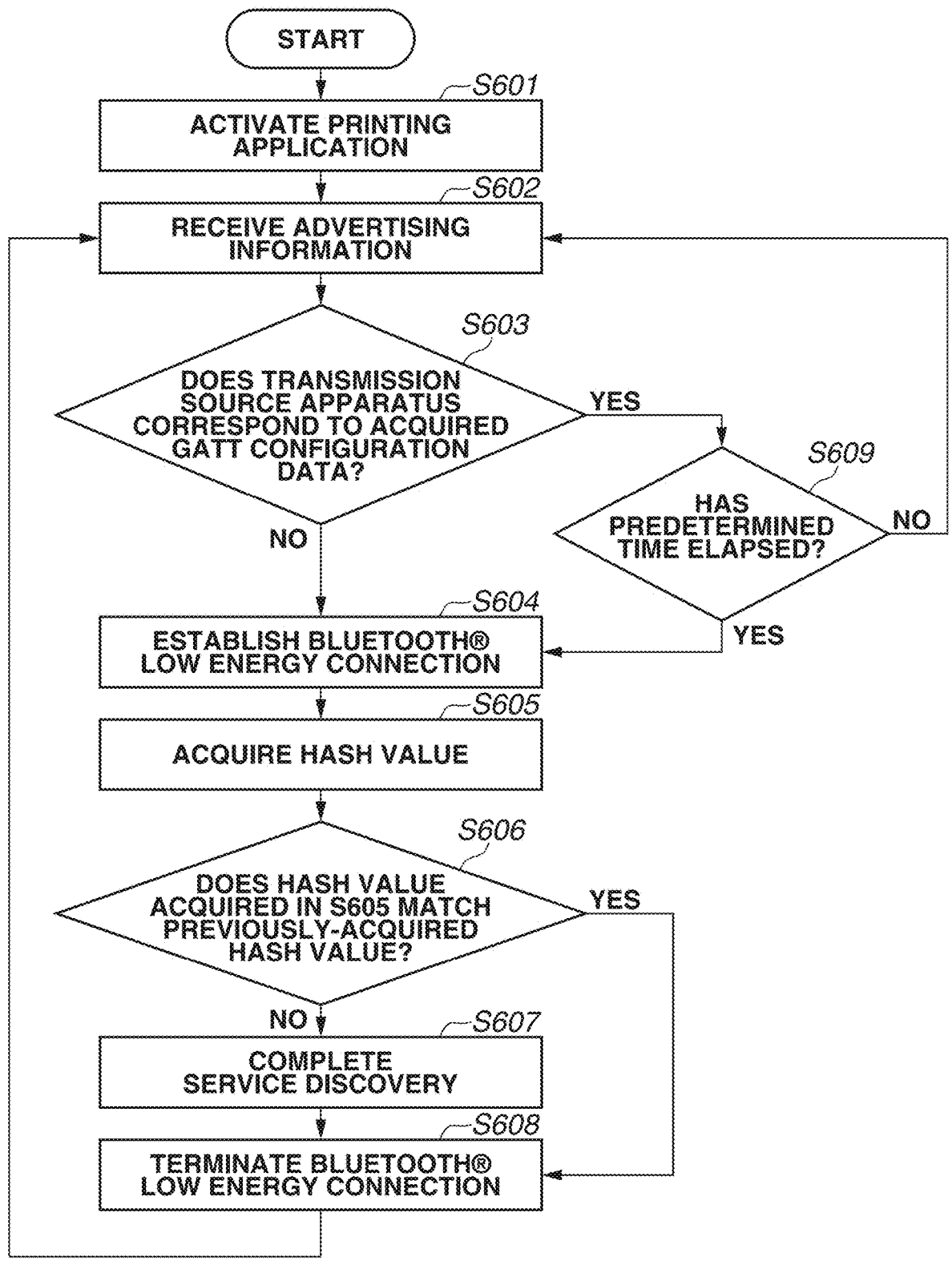
FIG. 6 is a flowchart illustrating processing for caching GATT configuration data.

FIG. 6 is a flowchart illustrating GATT configuration data caching processing to be executed by the information processing apparatus 101. This processing is implemented by the CPU 103 loading a control program and a printing application stored in the ROM 104 or the HDD (not illustrated) included in the information processing apparatus 101 into the RAM 105 and executing these programs. This processing is started based on issuance of an instruction indicating that the printing application is activated in the information processing apparatus 101.

The processing of steps S601 to S608 is similar to the processing of steps S401 to S408, and thus the descriptions thereof are omitted. In step S607, not only GATT configuration data, but also information about a time when GATT configuration data is acquired is cached.

In step S609 to be executed if it is determined that the apparatus that has transmitted the received advertising information does not correspond to the acquired GATT configuration data (NO in step S603), the CPU 103 determines whether a predetermined time has elapsed since the CPU 103 acquires GATT configuration data from the apparatus that has transmitted the adverting information received in step S602. The predetermined time is, for example, a time corresponding to a month. If the CPU 103 determines that the predetermined time has elapsed (YES in step S609), the processing proceeds to step S604, and the processing in step S604 and the subsequent steps are executed. More specifically, the CPU 103 acquires a hash value from the apparatus that has transmitted the advertising information received in step S602, and checks in detail whether the GATT configuration data of the apparatus is already acquired. Further, if the GATT configuration data of the apparatus is changed due to the lapse of time, the CPU 103 acquires GATT configuration data again from the apparatus. In this case, the CPU 103 may discard the GATT configuration data that is previously acquired from the apparatus (not latest data). On the other hand, if the CPU 103 determines that the predetermined time has not elapsed (NO in step S609), the processing returns to step S602 to wait for reception of adverting information from another apparatus, without newly acquiring a hash value or GATT configuration data from the apparatus.

With this configuration, if a certain time has elapsed after GATT configuration data is previously acquired and the configuration of GATT data held in the communication apparatus 151 is changed, GATT configuration data can be acquired again.

As described above, in the processing for automatically acquiring GATT configuration data, if advertising information is received, the information processing apparatus 101 determines whether GATT configuration data is already acquired from the apparatus that has transmitted the advertising information. Further, if GATT configuration data is already acquired from the apparatus that has transmitted the advertising information, the information processing apparatus 101 does not acquire a hash value or GATT configuration data. In the communication apparatus 151, the structure of GATT data may be changed by firmware update or the like.

If the structure of GATT data is changed, information cached in the information processing apparatus 101 cannot be used any more. If the advertising information transmitted from the communication apparatus 151 is changed from the advertising information transmitted when GATT configuration data is acquired, it is highly likely that the structure of the GATT data is changed. Thus, in a third exemplary embodiment, a configuration is described in which acquisition of a hash value and caching of GATT configuration data are executed again when the advertising information transmitted from the communication apparatus 151 is changed from the advertising information transmitted when GATT configuration data is acquired. Unless otherwise described, the configuration of the communication system according to the third exemplary embodiment is similar to the configuration of the communication system according to the first exemplary embodiment.

Figure 7:
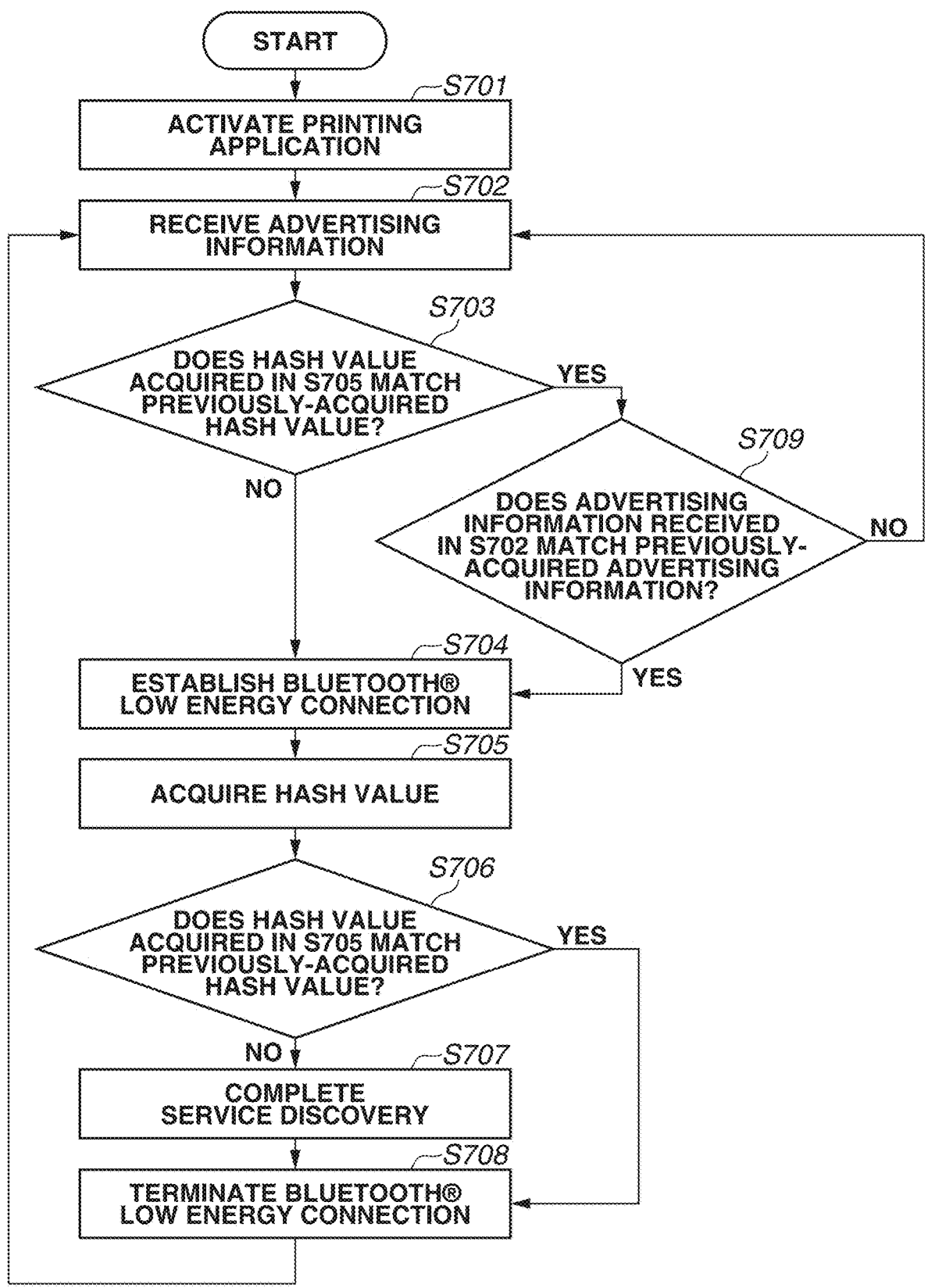
FIG. 7 is a flowchart illustrating processing for caching GATT configuration data.

FIG. 7 is a flowchart illustrating GATT configuration data caching processing to be executed by the information processing apparatus 101. This processing is implemented by the CPU 103 loading a control program and a printing application stored in the ROM 104 or the HDD (not illustrated) included in the information processing apparatus 101 into the RAM 105 and executing these programs. This processing is started based on issuance of an instruction indicating that the printing application is activated in the information processing apparatus 101.

The processing of steps S701 to S708 is similar to the processing of steps S401 to S408, and thus the descriptions thereof are omitted. In step S707, the advertising information transmitted by the apparatus that has acquired GATT configuration data is also cached in association with the GATT configuration data.

In step S709 to be executed if it is determined that the apparatus that has transmitted the received advertising information does not correspond to the acquired GATT configuration data (NO in step S703), the CPU 103 determines whether the advertising information received in step S702 matches the advertising information previously received from the apparatus that has transmitted the advertising information received in step S702. As described above, the cached GATT configuration data is associated with the advertising information. Accordingly, the already-cached advertising information is used as the advertising information previously received from the apparatus that has transmitted the advertising information received in step S702. If it is determined that the advertising information received in step S702 matches the previously-received advertising information (YES in step S709), the processing proceeds to step S704, and the processing in step S704 and the subsequent steps are executed. More specifically, the CPU 103 acquires a hash value from the apparatus that has transmitted the advertising information received in step S602, and checks in detail whether GATT configuration data of the apparatus is already acquired. Further, if the GATT configuration data held in the apparatus is changed due to the lapse of time, the CPU 103 acquires GATT configuration data again from the apparatus. In this case, the CPU 103 may discard the GATT configuration data that is previously acquired from the apparatus (not latest data). On the other hand, if it is determined that the advertising information received in step S702 does not match the previously-received advertising information (NO in step S709), the processing returns to step S702 to wait for reception of adverting information from another apparatus, without newly acquiring a hash value or GATT configuration data from the apparatus.

With this configuration, if the advertising information transmitted when GATT configuration data is previously acquired is changed and the configuration of GATT data held in the communication apparatus 151 is changed, GATT configuration data can be acquired again.

In the first exemplary embodiment, two hash value checking methods, i.e., the first acquisition method and the second acquisition method are described. In a fourth exemplary embodiment, a configuration for appropriately controlling which method is used depending on the situation will be described. Unless otherwise described, the configuration of the communication system according to the fourth exemplary embodiment is similar to the configuration of the communication system according to the first exemplary embodiment.

Figure 8:
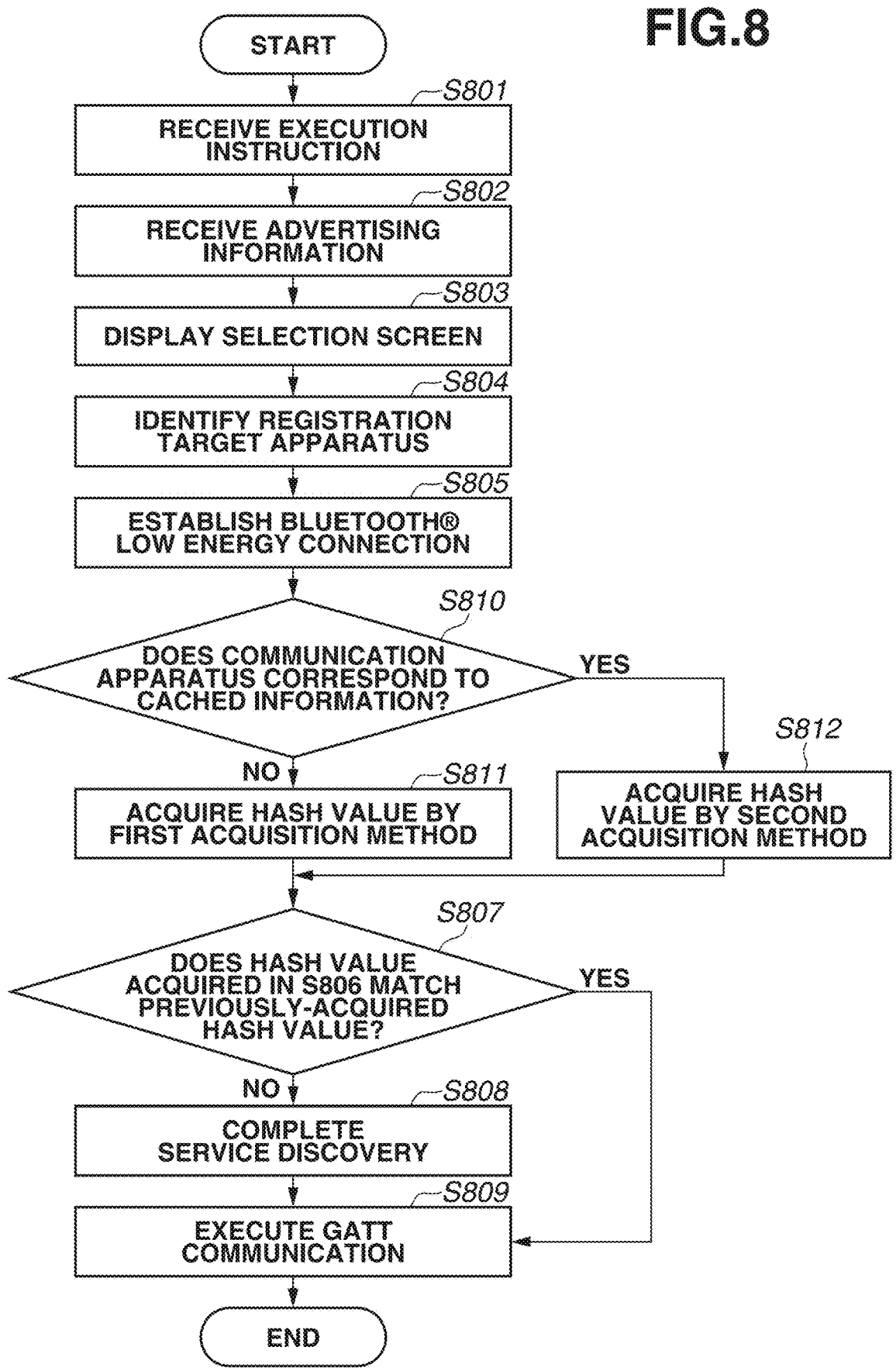
FIG. 8 is a flowchart illustrating a registration function.

FIG. 8 is a flowchart illustrating a registration function to be executed by the information processing apparatus 101. This processing is implemented by the CPU 103 loading a control program and a printing application stored in the ROM 104 or the HDD (not illustrated) included in the information processing apparatus 101 into the RAM 105 and executing these programs. This processing is started in a state where the printing application is activated in the information processing apparatus 101.

The processing of steps S801 to S805 is similar to the processing of steps S501 to S505 and the processing of steps S807 to S809 is similar to the processing of steps S507 to S509, and thus the descriptions thereof are omitted.

In step S810 to be executed after step S805, the CPU 103 determines whether the communication apparatus 151 that has established the Bluetooth® Low Energy connection with the information processing apparatus 101 in step S805 is an apparatus corresponding to the GATT configuration data cached by the information processing apparatus 101. The apparatus corresponding to the cached GATT configuration data is, for example, an apparatus including the same identifier as the identifier of the apparatus that has acquired the cached GATT configuration data. Examples of the identifier include information indicating the name or model name of the apparatus, the vendor of the apparatus, a service provided by the apparatus. In the present exemplary embodiment, assume that the information processing apparatus 101 also stores the identifier included in the apparatus that has acquired the GATT configuration data in association with the cached GATT configuration data during caching of the GATT configuration data. If the CPU 103 determines that the communication apparatus 151 that has established the Bluetooth® Low Energy connection with the information processing apparatus 101 in step S805 is not an apparatus corresponding to the cached GATT configuration data (NO in step S810), the processing proceeds to step S811. If the CPU 103 determines that the communication apparatus 151 that has established the Bluetooth® Low Energy connection with the information processing apparatus 101 in step S805 is an apparatus corresponding to the cached GATT configuration data (YES in step S810), the processing proceeds to step S812. If the CPU 103 includes a plurality of pieces of cached GATT configuration data, the CPU 103 executes the determination processing by using the plurality of pieces of cached GATT configuration data. If the communication apparatus 151 corresponds to at least one of the plurality of pieces of cached GATT configuration data, it is determined that the communication apparatus 151 that has established the Bluetooth® Low Energy connection with the information processing apparatus 101 in step S805 is an apparatus corresponding to the cached GATT configuration data (YES in step S810). If the communication apparatus 151 corresponds to none of the pieces of cached GATT configuration data, it is determined that the communication apparatus 151 that has established the Bluetooth® Low Energy connection with the information processing apparatus 101 in step S805 is not an apparatus corresponding to the cached GATT configuration data (NO in step S810).

If the communication apparatus 151 that has established the Bluetooth® Low Energy connection with the information processing apparatus 101 is an apparatus that does not include the same identifier as the identifier of the apparatus that has acquired the cached GATT configuration data, it is highly likely that the information processing apparatus 101 has not already cached the GATT configuration data of the communication apparatus 151. If the information processing apparatus 101 has cached a plurality of pieces of GATT configuration data, the information processing apparatus 101 cannot identify the GATT configuration data that is more likely to be the GATT configuration data of the communication apparatus 151 among the plurality of pieces of GATT configuration data. If the second acquisition method is executed in a state where the GATT configuration data that is more likely to be the GATT configuration data of the communication apparatus 151 cannot be identified, it takes a lot of time to determine whether the GATT configuration data of the communication apparatus 151 is already cached. This is because, in this configuration, if the CPU 103 cannot acquire a hash value after attempting to acquire a hash value using any one of the pieces of GATT configuration data, there is a need to acquire a hash value again using another GATT configuration data. Accordingly, the CPU 103 need to repeatedly attempt to acquire a hash value by the second acquisition method by up to the number of times corresponding to the number of pieces of GATT configuration data cached by the information processing apparatus 101.

Accordingly, in step S811 to be executed if it is determined that the communication apparatus 151 that has established the Bluetooth® Low Energy connection with the information processing apparatus 101 in step S805 is not an apparatus corresponding to the cached GATT configuration data (NO in step S810), the CPU 103 acquires a hash value by the first acquisition method. More specifically, the CPU 103 executes service discovery, identifies the area including the hash value based on at least a part of the GATT configuration data acquired by service discovery, and then attempts to acquire the hash value. Then, the processing proceeds to step S807. In step S807, it is determined whether the value acquired in step S811 matches the already-cached hash value.

On the other hand, if the communication apparatus 151 that has established the Bluetooth® Low Energy connection with the information processing apparatus 101 is an apparatus including the same identifier as the identifier of the apparatus that has acquired the cached GATT configuration data, it is highly likely that the information processing apparatus 101 has already cached the GATT configuration data of the communication apparatus 151. If the information processing apparatus 101 has cached a plurality of pieces of GATT configuration data, the information processing apparatus 101 can identify the GATT configuration data that is more likely to be the GATT configuration data of the communication apparatus 151 among the plurality of pieces of GATT configuration data. If the second acquisition method is executed in a state where the GATT configuration data that is more likely to be the GATT configuration data of the communication apparatus 151 can be identified, a hash value can be promptly acquired from the communication apparatus 151.

Accordingly, in step S811 to be executed if the communication apparatus 151 that has established the Bluetooth® Low Energy connection with the information processing apparatus 101 in step S805 is not an apparatus corresponding to the cached GATT configuration data (NO in step S810), the CPU 103 acquires a hash value by the second acquisition method. More specifically, the CPU 103 identifies the area including the hash value based on the cached GATT configuration data that is more likely to be the GATT configuration data of the communication apparatus 151, without executing service discovery, and then attempts to acquire the hash value. After that, the processing proceeds to step S807. In step S807, it is determined whether the hash value acquired in step S811 matches the already-cached hash value.

The processing of step S807 and subsequent steps thereof is similar to the processing of step S507 and subsequent steps thereof.

With this configuration, acquisition of a hash value can be executed more appropriately.

The determination processing in step S810 corresponds to the determination as to which one of the first acquisition method and the second acquisition method is used. The timing when the determination processing is executed is not particularly limited. More specifically, for example, the determination processing may be executed between step S804 and step S805. In this case, the CPU 103 determines whether the apparatus that is identified as the registration target in step S804 is an apparatus corresponding to the GATT configuration data cached by the information processing apparatus 101. If it is determined that the apparatus that is identified as the registration target in step S804 is an apparatus corresponding to the cached GATT configuration data (YES in step S810), step S812 is executed after step S805. If it is determined that the apparatus that is identified as the registration target in step S804 is not an apparatus corresponding to the cached GATT configuration data (NO in step S810), step S811 is executed after step S805.

The present disclosure can also be implemented by processing in which a program for implementing one or more functions according to the exemplary embodiments described above is supplied to a system or an apparatus via a network or a storage medium, and one or more processors in a computer of the system or apparatus read out and execute the program. The present disclosure can also be implemented by a circuit (e.g., an application specific integrated circuit (ASIC)) for implementing one or more functions according to the exemplary embodiments described above.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-102861, filed May 31, 2019, which is hereby incorporated by reference herein in its entirety.

What is claimed is:

1. A control method for an information processing apparatus that communicates with a communication apparatus through Bluetooth® Low Energy, the control method comprising:
   acquiring, as a first acquisition, information indicating a structure of Generic Attribute Profile (GATT) data included in the communication apparatus upon establishment of a first connection between the communication apparatus and the information processing apparatus through Bluetooth® Low Energy;
   acquiring, as a second acquisition, a predetermined type of information in the GATT data included in the communication apparatus;
   acquiring, as a third acquisition, at least a part of the information indicating the structure of the GATT data included in the communication apparatus upon establishment of a second connection between the communication apparatus and the information processing apparatus through Bluetooth® Low Energy until an area in which the predetermined type of information is stored in the GATT data included in the communication apparatus becomes identifiable;
   acquiring, as a fourth acquisition, the predetermined type of information based on at least a part of the information indicating the structure of the GATT data included in the communication apparatus; and
   acquiring newly, as a fifth acquisition, no information that is not acquired in the third acquisition from the information indicating the structure of the GATT data included in the communication apparatus in a case where the predetermined type of information acquired in the second acquisition matches the predetermined type of information acquired in the fourth acquisition, and acquiring newly, as the fifth acquisition, information that is not acquired in the third acquisition from the information indicating the structure of the GATT data included in the communication apparatus in a case where the predetermined type of information acquired in the second acquisition is different from the predetermined type of information acquired in the fourth acquisition.

2. The control method according to claim 1, wherein in a case where the communication apparatus to be connected with the information processing apparatus in the first connection is identical to the communication apparatus to be connected with the information processing apparatus in the second connection, the predetermined type of information acquired in the second acquisition matches the predetermined type of information acquired in the fourth acquisition, and
   wherein in a case where the communication apparatus to be connected with the information processing apparatus in the first connection is different from the communication apparatus to be connected with the information processing apparatus in the second connection, the predetermined type of information acquired in the second acquisition is different from the predetermined type of information acquired in the fourth acquisition.

3. The control method according to claim 1,
   wherein in a case where predetermined identification information included in the communication apparatus to be connected with the information processing apparatus in the first connection matches the predetermined identification information included in the communication apparatus to be connected with the information processing apparatus in the second connection, the predetermined type of information acquired in the second acquisition matches the predetermined type of information acquired in the fourth acquisition, and
   wherein in a case where the predetermined identification information included in the communication apparatus to be connected with the information processing apparatus in the first connection is different from the predetermined identification information included in the communication apparatus to be connected with the information processing apparatus in the second connection, the predetermined type of information acquired in the second acquisition is different from the predetermined type of information acquired in the fourth acquisition.

4. The control method according to claim 1, wherein the predetermined type of information is a hash value.

5. The control method according to claim 1,
   wherein the first connection is established without receiving, from a user, an instruction to execute a predetermined function including processing for establishing a connection between the communication apparatus and the information processing apparatus through Bluetooth® Low Energy, and
   wherein the second connection is established upon reception of the instruction to execute the predetermined function from the user.

6. The control method according to claim 5, wherein the predetermined function includes processing for registering information, in a predetermined program configured to execute the predetermined function, about the communication apparatus to be connected with the information processing apparatus in the second connection.

7. The control method according to claim 6, wherein the predetermined function includes processing for acquiring, via the second connection, connection information for establishing a connection with the communication apparatus to be connected with the information processing apparatus in the second connection through a communication method other than Bluetooth® Low Energy.

8. The control method according to claim 7, wherein the predetermined function includes processing for transmitting, via the second connection, information for connecting the communication apparatus to be connected with the information processing apparatus in the second connection to an external apparatus located outside of the communicaapparatus and outside of the information processing apparatus through a communication method other than Bluetooth® Low Energy.

9. The control method according to claim 8, wherein the communication method other than Bluetooth® Low Energy is Wireless Fidelity (Wi-Fi®).

10. The control method according to claim 1, further comprising receiving advertising information,
wherein in a case where the advertising information is received, the first connection between the information processing apparatus and the communication apparatus that has transmitted the received advertising information is established through Bluetooth® Low Energy.

11. The control method according to claim 10, further comprising executing determination processing for determining, in a case where the advertising information is received, whether the communication apparatus that has transmitted the received advertising information is an apparatus with which the information processing apparatus has previously established a connection through Bluetooth® Low Energy,
wherein in a case where the communication apparatus that has transmitted the received advertising information is determined to be the apparatus with which the information processing apparatus has previously established a connection through Bluetooth® Low Energy, the information indicating the structure of the GATT data included in the communication apparatus that has transmitted the received advertising information is not newly acquired, and
wherein in a case where the communication apparatus that has transmitted the received advertising information is determined not to be the apparatus with which the information processing apparatus has previously established a connection through Bluetooth® Low Energy, the information indicating the structure of the GATT data included in the communication apparatus that has transmitted the received advertising information is newly acquired.

12. The control method according to claim 11, further comprising executing determination processing for determining whether a predetermined time has elapsed after the information indicating the structure of the GATT data is acquired from the communication apparatus that has transmitted the received advertising information in a case where the communication apparatus that has transmitted the received advertising information is determined to be the apparatus with which the information processing apparatus has previously established a connection through Bluetooth® Low Energy,
wherein in a case where it is determined that the predetermined time has not elapsed after the information indicating the structure of the GATT data is acquired from the communication apparatus that has transmitted the received advertising information, the information indicating the structure of the GATT data included in the communication apparatus that has transmitted the received advertising information is not newly acquired, and
wherein in a case where it is determined that the predetermined time has elapsed after the information indicating the structure of the GATT data is acquired from the communication apparatus that has transmitted the received advertising information, the information indicating the structure of the GATT data included in the communication apparatus that has transmitted the received advertising information is newly acquired.

13. The control method according to claim 12, further comprising executing determination processing for determining whether the received advertising information matches the advertising information previously received from the communication apparatus that has transmitted the received advertising information in a case where the communication apparatus that has transmitted the received advertising information is determined to be the apparatus with which the information processing apparatus has previously established a connection through Bluetooth® Low Energy,
wherein in a case where it is determined that the received advertising information matches the advertising information previously received from the communication apparatus that has transmitted the received advertising information, the information indicating the structure of the GATT data included in the communication apparatus that has transmitted the received advertising information is not newly acquired, and
wherein in a case where it is determined that the received advertising information does not match the advertising information previously received from the communication apparatus that has transmitted the received advertising information, the information indicating the structure of the GATT data included in the communication apparatus that has transmitted the received advertising information is newly acquired.

14. The control method according to claim 1, wherein even in a case where the second connection is established in a state where pairing between the communication apparatus and the information processing apparatus through Bluetooth® Low Energy is not established, at least a part of the information indicating the structure of the GATT data included in the communication apparatus to be connected with the information processing apparatus in the second connection is not newly acquired.

15. The control method according to claim 1, further comprising transmitting to the communication apparatus a print job to be printed by the communication apparatus.

16. A control method for an information processing apparatus that communicates with a communication apparatus through Bluetooth® Low Energy, the control method comprising:
acquiring, as a first acquisition, information indicating a structure of GATT data included in the communication apparatus upon establishment of a first connection between the communication apparatus and the information processing apparatus through Bluetooth® Low Energy;
acquiring, as a second acquisition, predetermined information in the GATT data included in the communication apparatus;
identifying area information for identifying, based on the information indicating the structure of the GATT data included in the communication apparatus and acquired in the first acquisition, an area in which the predetermined information is stored in the GATT data included in the communication apparatus to which the information processing apparatus is connected in the first connection;
acquiring, as a third acquisition, specific information from an area corresponding to the area information among areas in the GATT data included in the communication apparatus to which the information processing apparatus is connected in a second connection upon establishment of the second connection between the communication apparatus and the information processing apparatus through Bluetooth® Low Energy; and acquiring newly, as a fourth acquisition, no information as the information indicating the structure of the GATT data included in the communication apparatus in a case where the predetermined information acquired in the second acquisition matches the specific information acquired in the third acquisition, and acquiring newly, as the fourth acquisition, information as the information indicating the structure of the GATT data included in the communication apparatus in a case where the predetermined information acquired in the second acquisition is different from the specific information acquired in the third acquisition.

17. The control method according to claim 16, wherein in a case where the communication apparatus to be connected with the information processing apparatus in the first connection is identical to the communication apparatus to be connected with the information processing apparatus in the second connection, the predetermined information acquired in the second acquisition matches the specific information acquired in the third acquisition, and wherein in a case where the communication apparatus to be connected with the information processing apparatus in the first connection is different from the communication apparatus to be connected with the information processing apparatus in the second connection, the predetermined information acquired in the second acquisition is different from the specific information acquired in the third acquisition.

18. The control method according to claim 16, wherein in a case where predetermined identification information included in the communication apparatus to be connected with the information processing apparatus in the first connection matches the predetermined identification information included in the communication apparatus to be connected with the information processing apparatus in the second connection, the predetermined information acquired in the second acquisition matches the specific information acquired in the third acquisition, and wherein in a case where the predetermined identification information included in the communication apparatus to be connected with the information processing apparatus in the first connection is different from the predetermined identification information included in the communication apparatus to be connected with the information processing apparatus in the second connection, the predetermined information acquired in the second acquisition is different from the specific information acquired in the third acquisition.

19. The control method according to claim 16, wherein the predetermined information is a hash value, and the area information is a handle value.

20. The control method according to claim 16, further comprising:

receiving advertising information;

acquiring, as a fifth acquisition, at least a part of the information indicating the structure of the GATT data included in the communication apparatus upon establishment of the second connection between the communication apparatus and the information processing apparatus through Bluetooth® Low Energy until an area in which the specific information is stored in the GATT data included in the communication apparatus becomes identifiable in a case where an apparatus that has transmitted the received advertising information corresponds to the previously-acquired information indicating the structure of the GATT data; and acquiring, as a sixth acquisition, the specific information based on at least a part of the information indicating the structure of the GATT data included in the communication apparatus, wherein in a case where the apparatus that has transmitted the received advertising information does not correspond to the previously-acquired information indicating the structure of the GATT data, the specific information is acquired from the area corresponding to the area information among the areas in the GATT data included in the communication apparatus to be connected with the information processing apparatus in the second connection upon establishment of the second connection between the communication apparatus and the information processing apparatus through Bluetooth® Low Energy.

* * * * *